US009674764B2

(12) United States Patent
Jain et al.

(10) Patent No.: US 9,674,764 B2
(45) Date of Patent: Jun. 6, 2017

(54) SYSTEM AND METHOD FOR PROVIDING INTERNET PROTOCOL FLOW MOBILITY IN A NETWORK ENVIRONMENT

(71) Applicant: CISCO TECHNOLOGY, INC., San Jose, CA (US)

(72) Inventors: Paras Jain, Bangalore (IN); Nithin Chitta, Bangalore (IN); Vimal Srivastava, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 87 days.

(21) Appl. No.: 14/538,334

(22) Filed: Nov. 11, 2014

(65) Prior Publication Data

US 2016/0135219 A1 May 12, 2016

(51) Int. Cl.
*H04Q 7/00* (2006.01)
*H04W 40/06* (2009.01)
*H04W 36/00* (2009.01)
*H04W 28/10* (2009.01)
*H04W 36/26* (2009.01)
*H04W 76/02* (2009.01)
*H04W 28/02* (2009.01)
(Continued)

(52) U.S. Cl.
CPC .......... *H04W 40/06* (2013.01); *H04L 47/2483* (2013.01); *H04W 28/0263* (2013.01); *H04W 28/10* (2013.01); *H04W 36/00* (2013.01); *H04W 36/26* (2013.01); *H04W 76/026* (2013.01); *H04W 36/14* (2013.01)

(58) Field of Classification Search
CPC .... H04W 74/002; H04W 40/06; H04W 74/04

USPC .......... 370/329, 330, 252, 254, 331
See application file for complete search history.

(56) References Cited

U.S. PATENT DOCUMENTS 8,144,591 B2 * 3/2012 Ghai .................. H04L 12/5695
370/235
8,400,916 B2 * 3/2013 Cutler ................ H04L 41/5029
370/230
(Continued)

FOREIGN PATENT DOCUMENTS

EP 2426964 3/2012
WO WO2014/035619 3/2014

OTHER PUBLICATIONS

U.S. Appl. No. 14/540,082, filed Nov. 13, 2014, entitled "System and Method for Providing Internet Protocol Flow Mobility in a Network Environment," Inventors: Paras Jain, et al.
(Continued)

*Primary Examiner* — Chuong T Ho
(74) *Attorney, Agent, or Firm* — Patent Capital Group

(57) ABSTRACT

An example method is provided in one example embodiment and may include receiving an indication of a radio access technology (RAT) change for a user equipment (UE); determining availability of a preferred RAT type for a policy related rule associated with the UE, wherein the policy related rule includes, at least in part, the preferred RAT type for one or more service data flows for the UE; and configuring the one or more service data flows for the UE based, at least in part, on a change in availability of the preferred RAT type following the RAT change. In at least one case, the method can include routing downlink packets to the UE using the one or more service data flows for the preferred RAT type if the preferred RAT type is available.

18 Claims, 22 Drawing Sheets

(51) Int. Cl.
*H04L 12/851* (2013.01)
*H04W 36/14* (2009.01)

(56) References Cited

U.S. PATENT DOCUMENTS

| | | | |
|---|---|---|---|
| 8,717,880 B2 | 5/2014 | Agulnik et al. | |
| 8,856,860 B2 * | 10/2014 | Grayson | H04L 12/66 726/1 |
| 9,264,942 B2 | 2/2016 | Sarkar et al. | |
| 9,294,982 B2 | 3/2016 | Srivastava et al. | |
| 9,295,070 B2 | 3/2016 | Damola | |
| 2002/0160777 A1 | 10/2002 | Takao et al. | |
| 2008/0046963 A1 * | 2/2008 | Grayson | H04L 12/66 726/1 |
| 2009/0141625 A1 * | 6/2009 | Ghai | H04L 12/5695 370/230 |
| 2009/0245202 A1 | 10/2009 | Gras et al. | |
| 2009/0258649 A1 | 10/2009 | Salowey | |
| 2009/0280771 A1 | 11/2009 | Bolin | |
| 2010/0075665 A1 | 3/2010 | Nader et al. | |
| 2011/0065435 A1 * | 3/2011 | Pancorbo Marcos | H04W 76/041 455/436 |
| 2011/0176417 A1 | 7/2011 | Kuwabara | |
| 2011/0305220 A1 | 12/2011 | Lindoff et al. | |
| 2011/0320580 A1 * | 12/2011 | Zhou | H04L 12/14 709/223 |
| 2011/0320620 A1 * | 12/2011 | Cutler | H04L 41/5029 709/229 |
| 2012/0099429 A1 | 4/2012 | Ludwig et al. | |
| 2012/0258674 A1 | 10/2012 | Livet et al. | |
| 2013/0021968 A1 | 1/2013 | Reznik | |
| 2013/0070596 A1 | 3/2013 | Yeh et al. | |
| 2013/0094475 A1 | 4/2013 | Song | |
| 2013/0155863 A1 | 6/2013 | Ludwig et al. | |
| 2013/0208605 A1 | 8/2013 | Bautista et al. | |
| 2013/0322300 A1 | 12/2013 | Landais et al. | |
| 2014/0064068 A1 | 3/2014 | Horn et al. | |
| 2014/0198637 A1 | 7/2014 | Shan et al. | |
| 2014/0254498 A1 | 9/2014 | Mueck et al. | |
| 2014/0341021 A1 * | 11/2014 | Han | H04L 47/2425 370/230 |
| 2015/0043349 A1 | 2/2015 | Zhu | |
| 2015/0105076 A1 * | 4/2015 | Gupta | H04W 40/244 455/435.3 |
| 2015/0215795 A1 | 7/2015 | Zhu | |
| 2015/0282021 A1 | 10/2015 | Pao et al. | |
| 2015/0319058 A1 | 11/2015 | Molinero Fernandez | |
| 2016/0135222 A1 * | 5/2016 | Jain | H04W 74/04 370/329 |
| 2016/0212668 A1 | 7/2016 | Castro Castro et al. | |

OTHER PUBLICATIONS

USPTO Feb. 11, 2016 Notice of Allowance from U.S. Appl. No. 14/165,248.
EPO Mar. 24, 2016 Search Report from European Application Serial No. 15194130.
Hakala, et al., "Diameter Credit-Control Application," Network Working Group, RFC 4006, Aug. 2005, 119 pages; http://www.ietf.org/rfc/rfc4006.txt.
Bernardos, "Proxy Mobile IPv6 Extensions to Support Flow Mobility," NETEXT Working Group, Internet-Draft, Intended status: Standards Track, Expires: Jan. 24, 2015, Jul. 2014, 22 pages; http://tools.ietf.org/html/draft-ietf-netext-pmipv6-flowmob-11.
"ETSI TS 123 261 V12.0.0 (Sep. 2014) Technical Specification: Universal Mobile Telecommunications System (UMTS); LTE; IP flow mobility and seamless Wireless Local Area Network (WLAN) offload; Stage 2 (3GPP TS 23.261 version 12.0.0 Release 12)," European Telecommunications Standards Institute (ETSI), 650 Route des Lucioles, F-06921 Sohia Antipolis Cedex-France, Sep. 2014; 24 pages.
"ETSI TS 129 212 V12.6.0 (Oct. 2014) Technical Specification: Universal Mobile Telecommunications System (UMTS); LTE; Policy and Charging Control (PCC); Reference points (3GPP TS 29.212 version 12.6.0 Release 12)," European Telecommunications Standards Institute (ETSI), 650 Route des Lucioles, F-06921 Sohia Antipolis Cedex-France, Oct. 2014; [See Section 4.3.1, pp. 19-21 and Section 5.3.31, p. 113]; 23 pages.
European Telecommunications Standard Institute, Universal Mobile Telecommunications System (UMTS); LTE; IP flow mobility and seamless Wireless Local Area Network (WLAN) offload; Stage 2, (3GPP TS 23.261 version 11.0.0.0 Release 11), Sep. 2012, 8 pages.
Wikipedia, the free encyclopedia, "System Architecture Evolution," last modified Aug. 23, 2013; retrieved and printed on Jan. 27, 2014, 24 pages; http://en.wikipedia.org/wiki/System_Architecture_Evolution.
USPTO Jun. 16, 2015 Non-Final Office Action from U.S. Appl. No. 14/540,082.
USPTO Oct. 7, 2016 Notice of Allowance from U.S. Appl. No. 14/540,082.

* cited by examiner

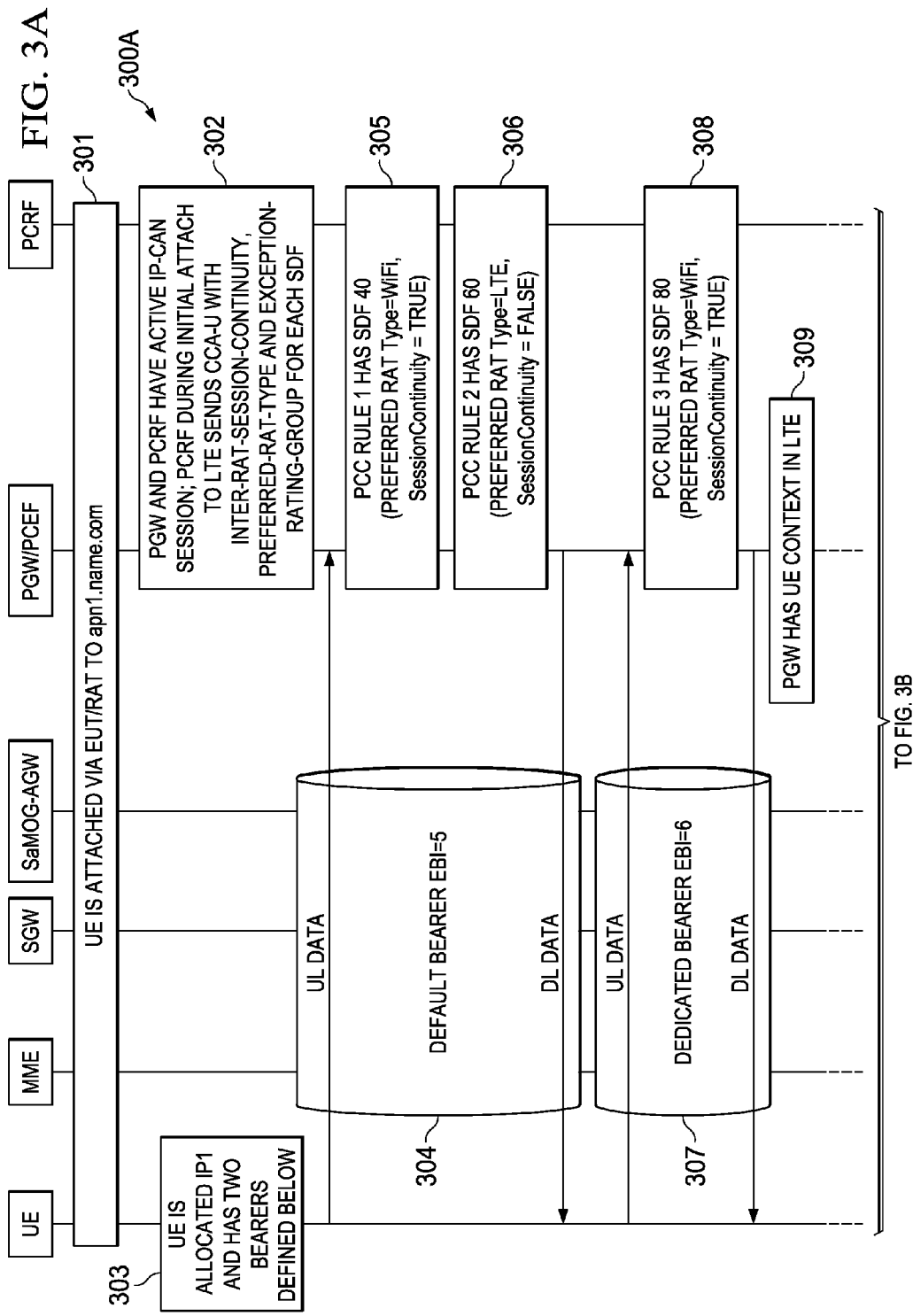

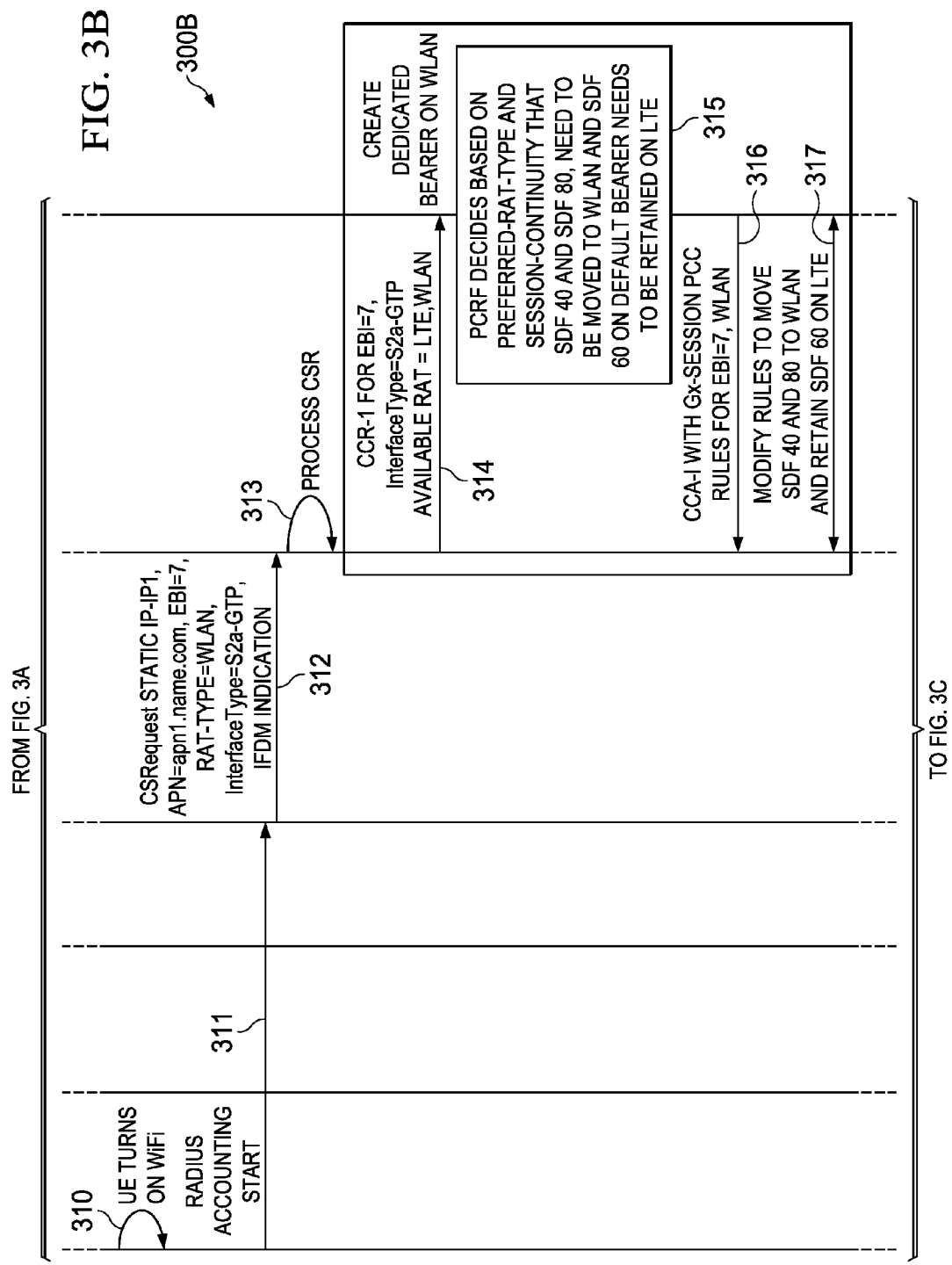

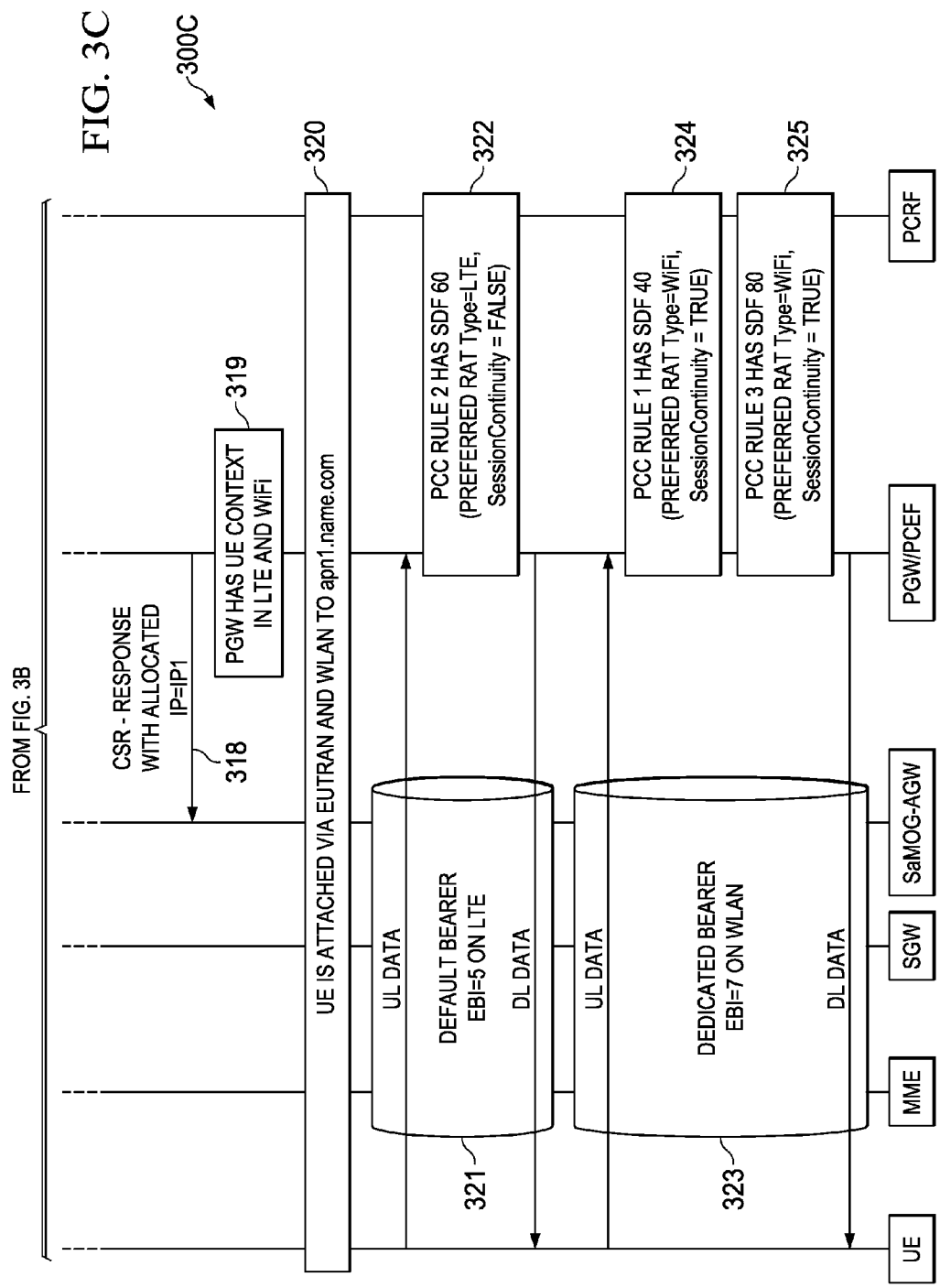

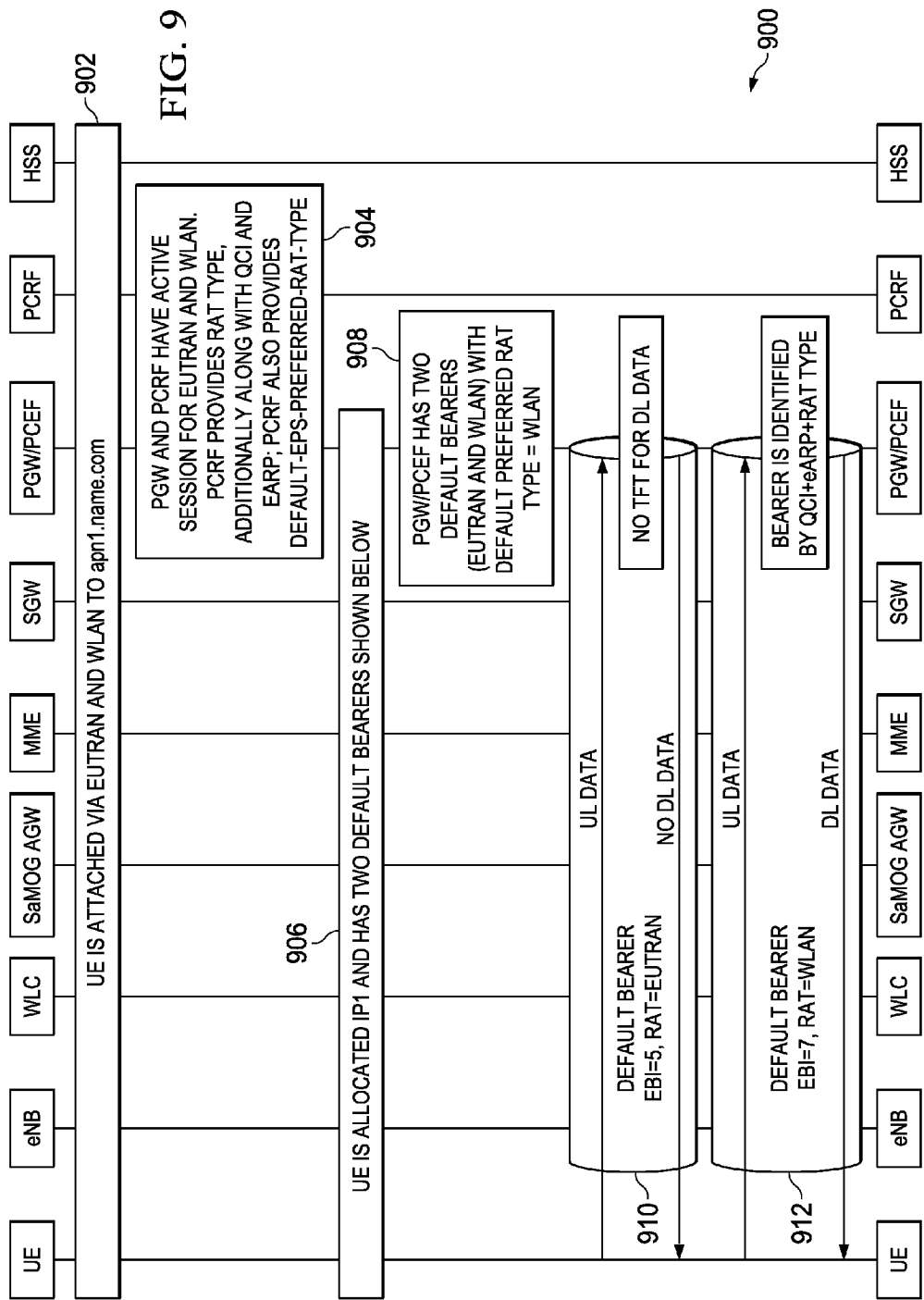

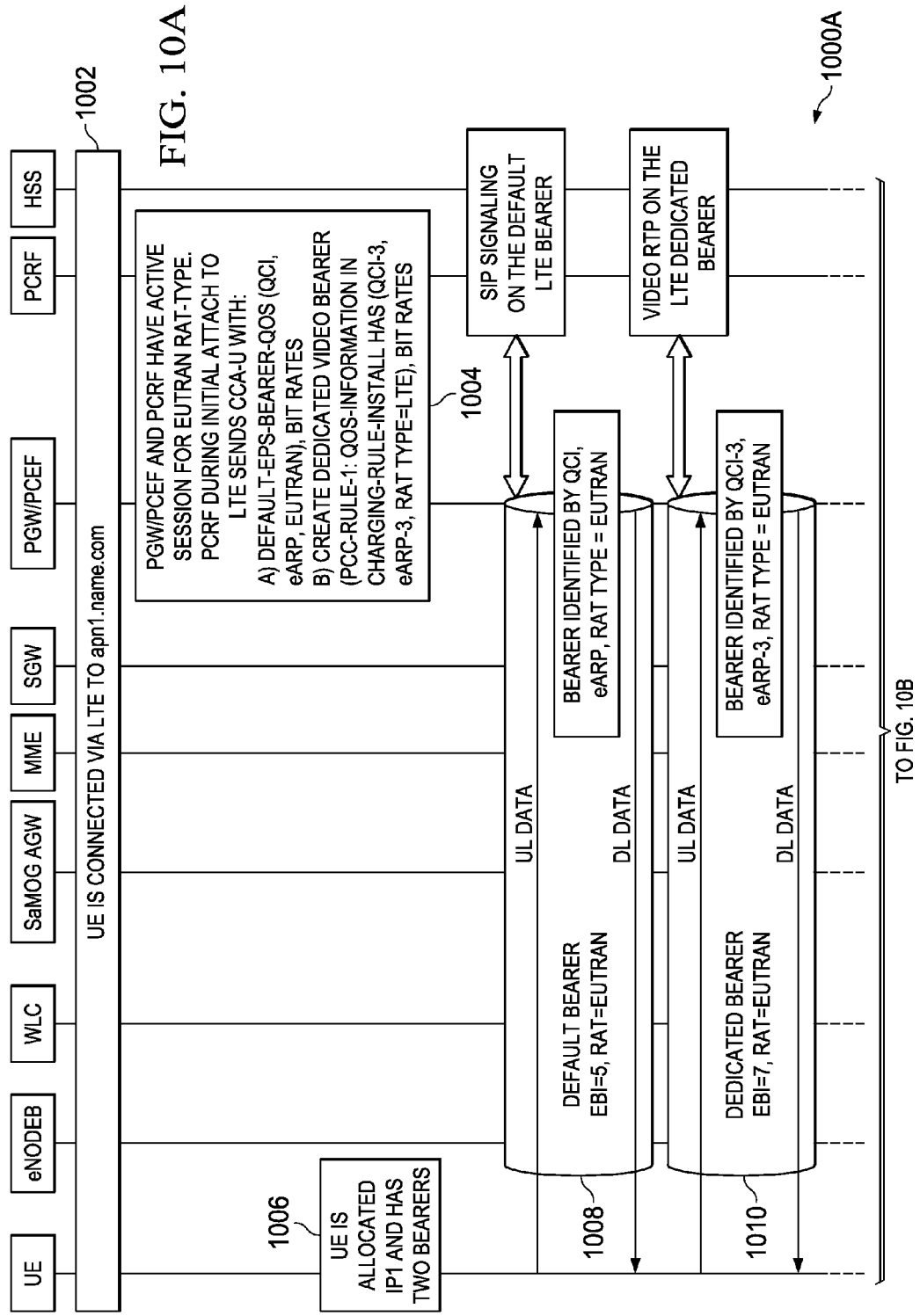

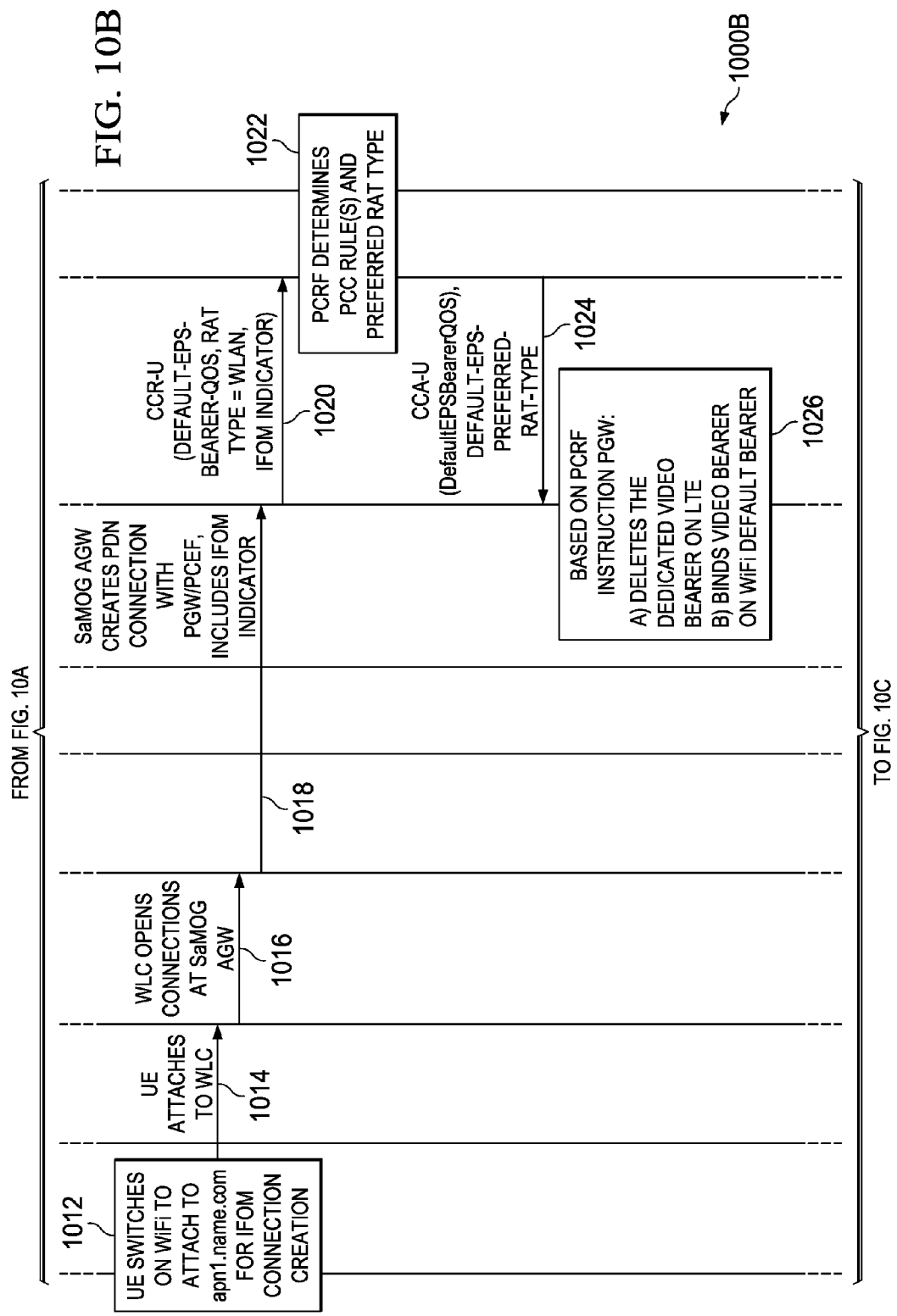

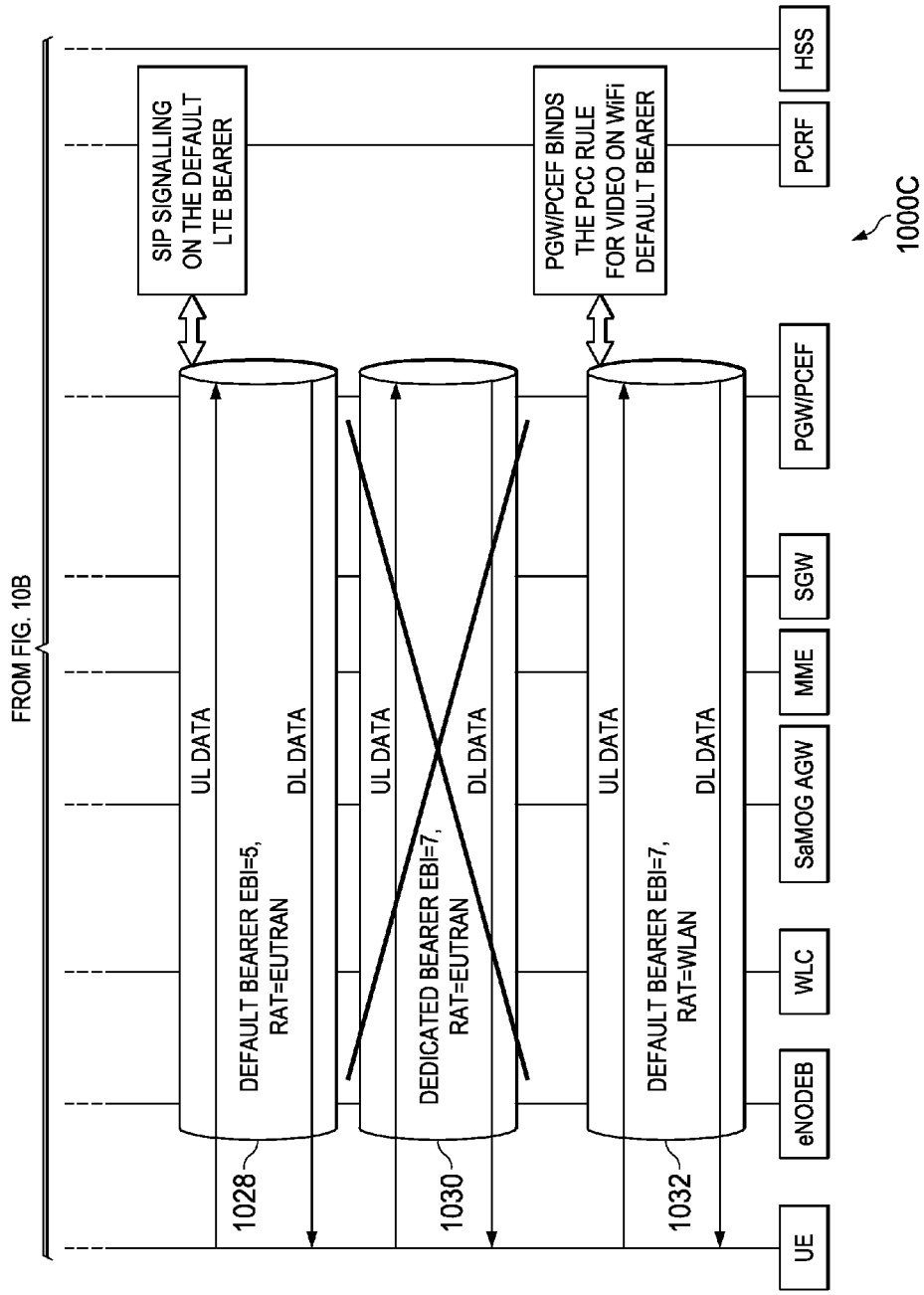

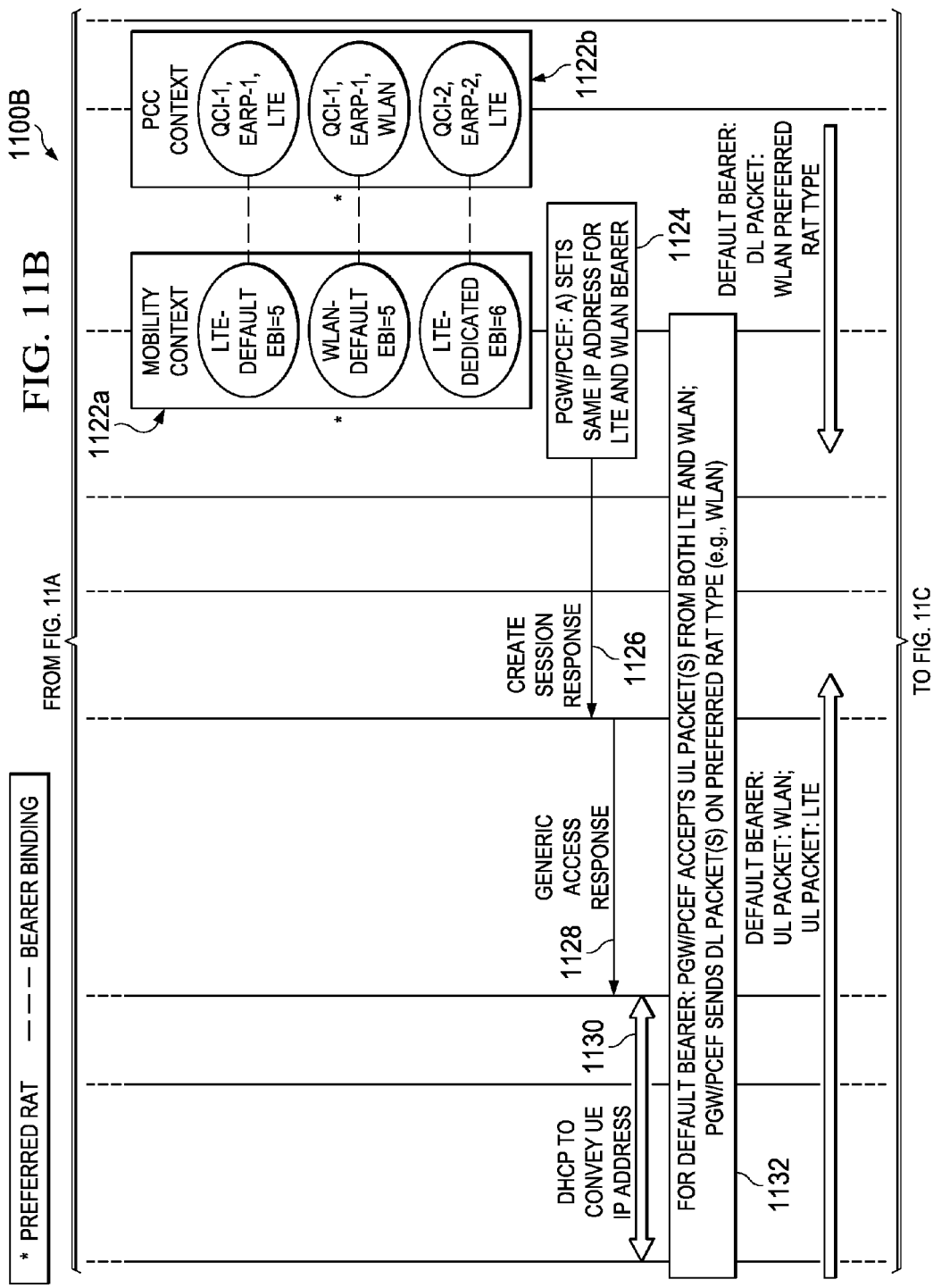

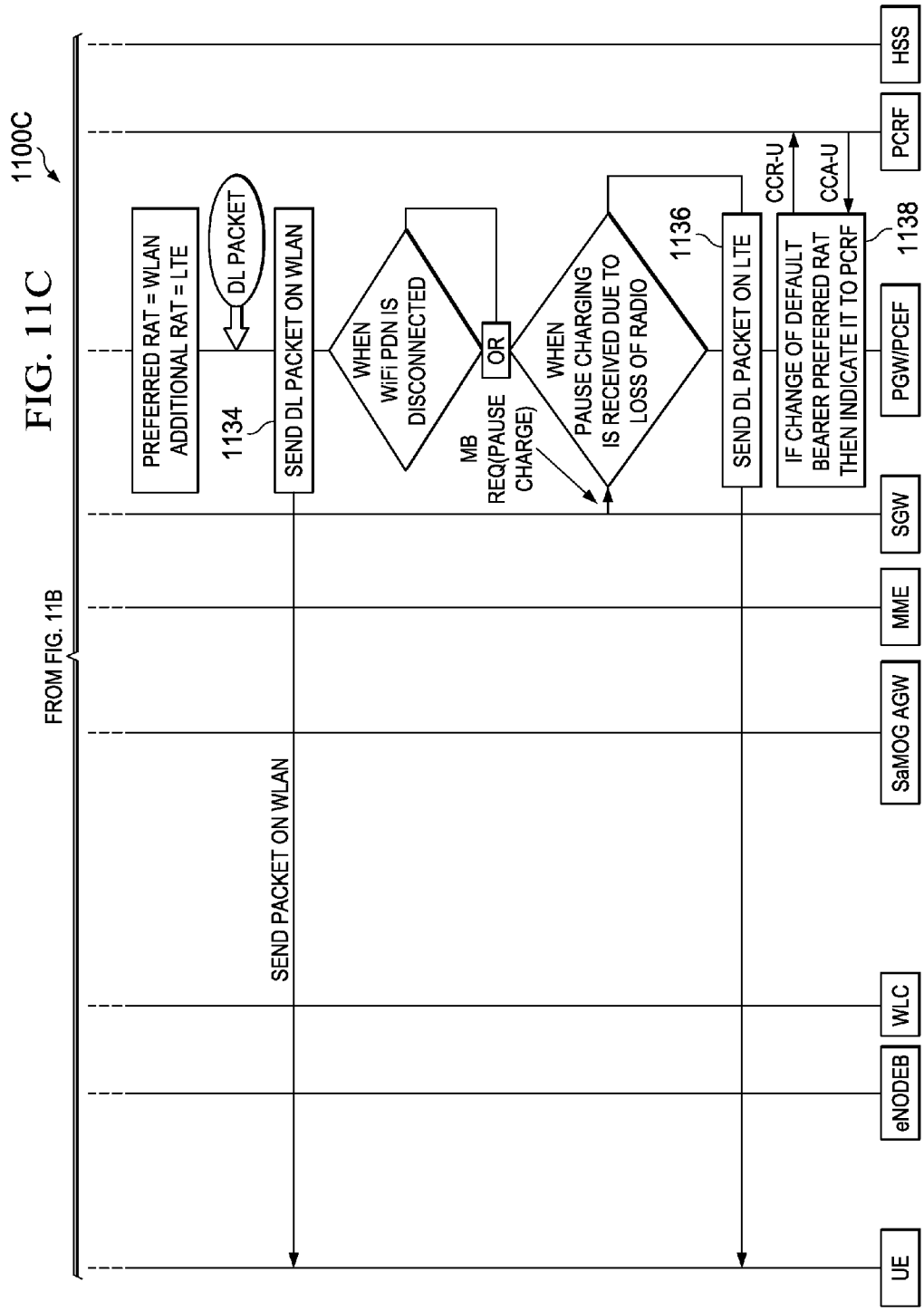

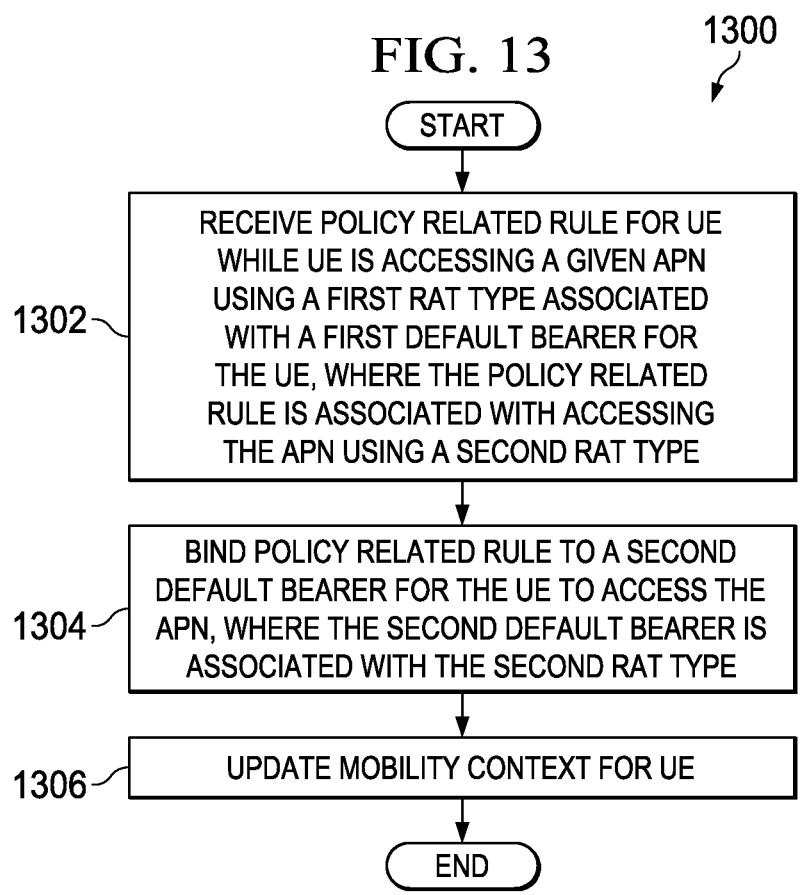

SYSTEM AND METHOD FOR PROVIDING INTERNET PROTOCOL FLOW MOBILITY IN A NETWORK ENVIRONMENT

TECHNICAL FIELD

This disclosure relates in general to the field of communications and, more particularly, to a system and method for providing Internet protocol (IP) flow mobility in a network environment.

BACKGROUND

Networking architectures have grown increasingly complex in communications environments, particularly mobile wireless environments. For example, network providers have developed architectures in which the provider includes both mobile networks and WiFi networks that are each accessible from user equipment having multi-mode capability. In some situations, the network provider may allow user equipment to connect simultaneously to both the mobile and WiFi networks. However, there are significant challenges in managing mobility of user equipment within mobile and WiFi networks, particularly when the user equipment connects to the same access point name through the mobile network and the WiFi network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 3A-3C are simplified flow diagrams illustrating potential flows and activities associated with providing service data flow mobility to enable IP flow mobility in accordance with one potential embodiment of the present disclosure;

FIG. 9 is a simplified flow diagram illustrating potential flows and activities associated with providing bearer binding to enable IP flow mobility in accordance with one potential embodiment of the present disclosure;

FIGS. 10A-10C are simplified flow diagrams illustrating other potential flows and activities associated with providing bearer binding to enable IP flow mobility in accordance with one potential embodiment of the present disclosure;

FIGS. 11A-11C are simplified flow diagrams illustrating yet other potential flows and activities associated with providing bearer binding to enable IP flow mobility in accordance with one potential embodiment of the present disclosure;

FIG. 13 is a simplified flow diagram illustrating example operations associated with providing bearer binding to enable IP flow mobility in accordance with one potential embodiment of the present disclosure.

DETAILED DESCRIPTION OF EXAMPLE EMBODIMENTS

Overview

A method is provided in one example embodiment and may include receiving an indication of a radio access technology (RAT) change for a user equipment (UE); determining availability of a preferred RAT type for a policy related rule associated with the UE, wherein the policy related rule includes, at least in part, the preferred RAT type for one or more service data flows for the UE; and configuring the one or more service data flows for the UE based, at least in part, on a change in availability of the preferred RAT type following the RAT change. In at least one case, the method can include routing downlink packets to the UE using the one or more service data flows for the preferred RAT type if the preferred RAT type is available.

In at least one instance, determining can include one of: determining that the preferred RAT type for the one or more service data flows has become available following the RAT change; determining that the preferred RAT type for the one or more service data flows has become unavailable following the RAT change; and determining that the preferred RAT type for the one or more service data flows has remained available following the RAT change. In at least one instance, if the preferred RAT type has become available, the configuring can include moving the one or more service data flows to the preferred RAT type. In at least one instance, the configuring can include removing the policy related rule for a current RAT type to which the UE is connected and installing another policy related rule for the preferred RAT type which has become available. In at least one instance, the preferred RAT type can be WiFi for the one or more service data flows.

In at least one instance, if the preferred RAT type has become unavailable, the configuring can include: determining whether the one or more service data flows can be moved to a non-preferred RAT type, which is currently available to the UE, based, at least in part, on a session continuity indicator for the one or more service data flows; and moving the one or more service data flows to the non-preferred RAT type if the session continuity indicator provides for inter-RAT session continuity.

In at least one case, the method can include determining whether an uplink packet for the policy related rule is received from the UE using the preferred RAT type; and applying an exception rating group for charging a session associated with the UE if the uplink packet is not received from the UE using the preferred RAT type.

Example Embodiments

Figure 1:
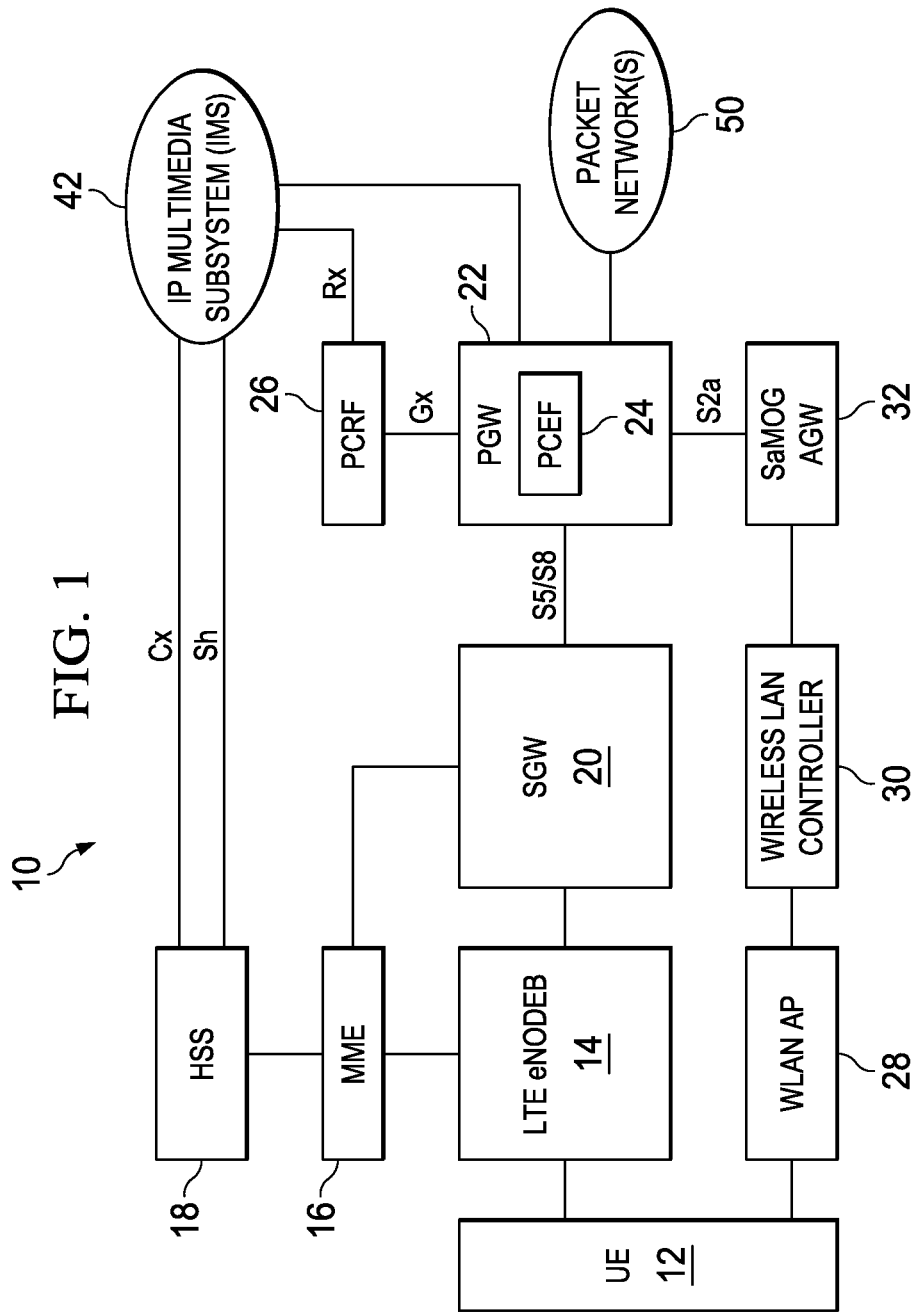
FIG. 1 is a simplified block diagram illustrating a communication system to facilitate IP flow mobility a network environment according to one embodiment of the present disclosure.

Turning to FIG. 1, FIG. 1 is a simplified block diagram illustrating a communication system 10 to provide IP flow mobility (IFOM) in a network environment according to one embodiment of the present disclosure. This particular configuration may be tied to the 3rd Generation Partnership Project (3GPP) Evolved Packet System (EPS) architecture, also sometimes referred to as the Long-term Evolution (LTE) EPS architecture. Alternatively, the depicted architecture may be applicable to other environments equally. 3GPP standards, such as, for example, Release 11 (Rel-11), define interworking between a wireless local access network (WLAN) and LTE access systems for S2a Mobility based on general packet radio service (GPRS) tunneling protocol (GTP), generally referred to using the term 'SaMOG'.

The example architecture of FIG. 1 includes user equipment (UE) 12, an LTE evolved Node B (eNodeB) 14, a mobility management entity (MME) 16, a home subscriber server (HSS) 18, a serving gateway (SGW) 20, a packet data network (PDN) gateway 22, a policy and charging rules function (PCRF) 26, a WLAN access point (AP) 28, a wireless LAN controller (WLC) 30, a SaMOG access gateway (AGW) 32, an IP Multimedia Subsystem (IMS) 42 and one or more packet network(s) 50. In various embodiments, PGW 22 may include a policy and charging enforcement function (PCEF) 24.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. For example, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

In at least one embodiment, UE 12 is a mobile device having multi-mode capabilities and is able to simultaneously communicate with LTE eNodeB 14 using one or more mobile wireless connections such as LTE connections and communicate with WLAN AP 28 using one or more wireless LAN access connections such as WiFi access connections and/or Worldwide Interoperability for Microwave Access (WiMAX) access connections. In accordance with various embodiments, UE 12 can be associated with clients or customers wishing to initiate a flow in communication system 10 via some network. The terms 'user equipment', 'mobile node', 'end user', 'and 'subscriber' are inclusive of devices used to initiate a communication, such as a computer, a personal digital assistant (PDA), a laptop or electronic notebook, a cellular telephone, an i-Phone®, i-Pad®, a Google® Droid® phone, an IP phone, or any other device, component, element, or object capable of initiating voice, audio, video, media, or data exchanges within communication system 10 using multiple access technologies.

UE 12 may also be inclusive of a suitable interface to the human user such as a microphone, a display, a keyboard, or other terminal equipment. UE 12 may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

In certain embodiments, UE 12 may have a bundled subscription for network access and application services (AS) (e.g., voice over LTE (VoLTE), etc.). Once an access session is established, a user can register for application services as well. IP addresses can be assigned to UE 12 using dynamic host configuration protocol (DHCP), Stateless Address Auto-configuration, default bearer activation, etc., or any suitable variation thereof.

LTE eNodeB 14 may be further communication with MME 16. Among other things, MME 16 may provide tracking area list management, idle mode UE tracking, bearer activation and deactivation, serving gateway and packet data network gateway selection for UEs and authentication services. MME 16 may be in communication with HSS 18 which may include one or more databases containing user-related and subscription-related information. HSS 18 may perform functionalities such as mobility management, call and session establishment support, user authentication and access authorization.

LTE eNodeB 14 and MME 16 may be in further communication with SGW 20. SGW 20 may route and forward user data packets (e.g., flows) and may also act as the mobility anchor for the user plane during inter-eNodeB handovers and as the anchor for mobility between LTE and other 3GPP technologies. SGW 20 may be in further communication with PGW 22, including PCEF 24. PGW 22 may provide IP connectivity access network (IP-CAN) session connectivity from UE 12 to external packet data network(s) 50 and IMS 42 by being the point of exit and entry of traffic for UE 12. PGW 22 and PCEF 24 may be in further communication with PCRF 26. Note for various operations, functions and/or activities outlined herein, PGW 22 and PCEF 24 may be referred to collectively as 'PGW 22/PCEF 24' as various operations, functions and/or activities may be performed with both elements operating in conjunction with each other.

PCRF 26 may aggregate information to and from the network, operational support systems, such as IMS 42, and other sources (such as portals) in real time, supporting the creation of rules and then automatically making policy decisions for each subscriber. PCRF 26 can be configured to use user subscription information as a basis for the policy and charging control decisions. The subscription information may apply for both session-based and non-session based services. As noted, PCRF 26 may provision policy charging and control (PCC) rules for PGW 22 and PCEF 24. Additionally, PCRF 26 may determine PCC rules based on an application or service described to the PCRF from an application function (AF), which can be provisioned by a network operator within IMS 42. An AF may describe applications/services to PCRF 26 that may require dynamic policy and/or charging control for UE 12. The dynamic policy and/or charging controls may include, but not be limited to, controlling the detection for service data flows, setting charging instructions or rules for service data flows (SDFs), setting quality of service (QoS) levels for SDFs and/or gating.

In various embodiments, PCRF 26 may communicate PCC rules to PGW 22 and PCEF 26. PGW 22 and PCEF 24 may serve as policy enforcement points to manage QoS, online/offline flow-based charging, data generation, deep-packet inspection and intercept. IMS 42 may provide, among other things, voice over LTE (VoLTE) capabilities for UE 12 via one or more call session control functions (CSCFs), which may be referred to collectively as Session Initiation Protocol (SIP) servers.

WLAN AP 28 may be in further communication with WLC 30. WLC 30 may be responsible for system wide wireless LAN functions, such as security policies, intrusion prevention, RF management, QoS, and mobility. WLC 30 may be in further communication with SaMOG AGW 32. SaMOG AGW 32 may be in communication with PGW 22 and may provide connectivity from UE 12 to external packet data network(s) 50 and IMS 42.

Access networks may be 3GPP access networks including legacy access networks such as Global System for Mobile communications (GSM) Enhanced Data rates for GSM Evolution (EDGE) Radio Access Network (GERAN), Universal Mobile Telecommunications System (UMTS) Terrestrial Radio Access Network (UTRAN), generally referred to as 3G, and/or LTE access networks such as Evolved UTRAN (EUTRAN), generally referred to as 4G/LTE/LTE-Advanced (LTE-A), or they may be non-3GPP IP access networks such as digital subscriber line (DSL), Cable, WLAN (e.g., WiMAX, WiFi) or the Internet.

Non-3GPP IP access networks can be divided into trusted and untrusted segments. For the trusted segment, a viable relationship exists between a service provider and the core network, including PGW 22, PCRF 26, etc. Trusted IP access networks support mobility and policy interfaces as well as authentication, authorization and accounting (AAA) interfaces to the core network, whereas untrusted networks do not. Instead, access from untrusted access networks may be achieved via an evolved packet data gateway (ePDG) (not shown), which may provide for security associations to the user equipment over the untrusted IP access network.

Although various embodiments are described herein using an LTE access network and a WLAN access network, it should be understood that in other embodiments the principles described herein may be applied to other radio access networks such as 4G/3G, etc.

Also provided in the architecture of FIG. 1 are a series of interfaces, which can offer mobility, policy control, AAA functions and/or charging activities (offline and online) for various network elements. For example, interfaces can be used to exchange point of attachment, location, and/or access data for one or more end users, for example, users operating UE 12. Resource information, accounting information, location information, access network information, network address translation (NAT) control, etc. can be exchanged using a remote authentication dial in user service (RADIUS) protocol or any other suitable protocol where appropriate. Other protocols that can be used in communication system 10 can include DIAMETER protocol, service gateway interface (SGI), terminal access controller access-control system (TACACS), TACACS+, etc.

As shown in FIG. 1, a DIAMETER-based interface, Rx, may be maintained between IMS 42 (e.g., one or more application function (AF) included therein) and PCRF 26 for communicating information between IMS 42 and PCRF 26. A DIAMETER-based interface, Sh, may be maintained between HSS 18 and IMS 42 (e.g., one or more application service (AS) included therein) and a DIAMETER based interface, Cx, may be maintained between HSS 18 and IMS 42 (e.g., one or more CSCFs included therein). PCRF 26 may provision policy charging and control (PCC) rules for PGW 22 and PCEF 24 using a DIAMETER-based Gx interface. Also, shown in FIG. 1, a DIAMETER-based interface, S2a, may be provisioned between SaMOG AGW 32 and PGW 22, including PCEF 24. Other signaling interfaces are illustrated between various components of FIG. 1 (e.g., an S5/S8 interface between SGW 20 and PGW 22), according to 3GPP standards, which are not described in detail for purposes of brevity.

Before detailing some of the operational aspects of FIG. 1, certain contextual information is provided to understand different scenarios involving LTE-WiFi networking. Such information is offered earnestly and for teaching purposes only and, therefore, should not be construed in a way to limit the broad applications and teachings of the present disclosure. In a multiple access connectivity scenario, a given UE connects to both LTE and WiFi simultaneously. This results in at least two PDN connections with unique IP addresses for each. Charging and policy are performed for each PDN connection separately. According to the 3GPP standards definition, multi-access is provided when the access point name (APN) is different for each access. At the time of an attach by the UE, if an APN is different, a separate IP address is assigned. However, by 3GPP definition, if the APN is the same, handover is performed (and the IP address preserved), implying that the previous access is considered no longer available.

In a handover scenario, a given UE may be initially connected to an LTE network and subsequently undergo handover to a Wi-Fi network. Alternately, the UE may initially be connected to the Wi-Fi network and subsequently undergo a handover to LTE. In either situation, the expectation is that the UE's IP address is preserved across handover. The UE is expected to "move" its PDN connection from one access to another as well as provide a handover indication to the network. Charging and policy are performed for only one PDN connection. By the 3GPP standards definition, as noted previously, a handover takes place when the APN is the same for the new access as in the previous access. However, as of 3GPP Rel-11, handover between LTE and WiFi is not specified, and UEs do not perform handover operations. Instead, UEs typically maintain connectivity over both the accesses. A UE may hand-in and hand-out of WiFi frequently, causing traffic to change paths accordingly. It should be noted that PDN handover does not imply relinquishing the radio access as a UE can be connected to LTE on a different PDN while it moves a PDN from LTE to WiFi.

In an IP flow mobility (IFOM) scenario, a given UE is connected to both the LTE and WiFi access networks simultaneously and select flows are moved from one access to another according to configuration parameters indicated by the network operator. Flow bindings established at the PGW and the UE determine how the packets are routed, taking precedence over assigned IP addresses over the individual interfaces. Charging and policy are performed for each PDN connection separately. According to the 3GPP standards definition, multi-access (with different APNs) is necessary before select flows are moved from one access to another. Accordingly, IFOM is a combination of multi-access and handover and implies simultaneous multi-access while providing the ability to maintain IP preservation across the access. Only client-based IFOM is specified in 3GPP standards, and this requires a so-called S2c connectivity, which is not used in deployments today.

In current implementations, when a LTE-connected UE attaches to WiFi with a common APN, the procedure is considered a handover, which implies that either the LTE PDN or the WiFi PDN is maintained, but not both. Thus, for example, if there are flows on a default bearer and a dedicated bearer for a PDN connection on LTE, all the flows on both the bearers are moved to WiFi during such a handover. For example, in current implementations the PCRF maintains PCC rules per UE session and a RAT change trigger is received at the PCRF for the entire IP-CAN session for the UE. Upon receiving the RAT change Gx trigger, the PCRF currently removes all the rules for the UE and reconfigures new rules for the newly available RAT.

In accordance with various embodiments described herein, communication system 10 can provide for maintaining flows on both LTE and WiFi radio access technology (RAT) types simultaneously through operation of policy rules and their enforcement to allow flows on bearers to be selectively moved to desired radio access technology types. For example, upon WiFi attachment, some flows could be moved to WiFi while the remaining flows can be maintained on the LTE network. Note, in reference to RAT type(s) as described herein in this Specification, the terms 'WiFi' and 'WLAN' can be RAT types referred to interchangeably and the terms 'LTE' and 'EUTRAN' can be RAT types referred to interchangeably.

In various embodiments, communication system 10 may provide a mechanism between PCEF 24 and PCRF 26 wherein the PCRF may operate on each rule for a Gx interface-based policy trigger and may specify how a given SDF should be treated upon a RAT change, rather than deleting and updating the entire IP-CAN session upon such RAT changes. In various embodiments, PCRF 26 can, depending upon a preferred RAT for a given flow and inter RAT continuity for the flow, reconfigure the rules to move flows from one RAT to another RAT. Accordingly, one or more embodiments may provide network-based IP flow mobility at the granularity of a SDF using a single PDN connection, which may be conceptually referred to as 'SDF Mobility' henceforth. In addition, certain embodiments may provide various Policy methods and operations for achieving such flow Mobility.

In certain embodiments, one or more of the following assumptions may exist: UEs are unmodified and incapable of providing indications such as handover, APN, etc.; UEs are capable of handling the same IP address across physical interfaces; and if IFOM is enabled, the UE is configured with flow rules that determine the access type to use for individual flows.

As previously discussed, providing IFOM would typically require separate APNs and corresponding PDNs for current implementations. However, embodiments described herein enable flow Mobility with the same single APN, which may be configured in HSS 18 and provided to the trusted WiFi access during UE authentication.

In operation, each bearer of a PDN can be associated with certain PCC rules. In various embodiments, the PCC rules can consist of many parameters, including, but not limited to, rule name, Service Data Flow (SDF) filters, charging information, QoS information, such as QoS class identifier (QCI), allocation and retention priority (ARP), bit rates and so on. Multiple PCC rules can map to a given bearer but multiple bearers cannot map to an SDF. In various embodiments, by associating a RAT type with a PCC rule, it is possible to achieve flow mobility.

Currently, a PCC rule consists of information as described in 3GPP TS 29.21, Section 4.3.1. In various embodiments, the solution provided by communication system 10 can include defining new data structures for PCC rules, which in addition to the parameters noted previously can further include an Inter-RAT-Session-Continuity attribute value pair (AVP), a Preferred-RAT-Type AVP, and an Exception-Rating-Group AVP. The AVPs may be included in PCC rules to enable flow level mobility.

In various embodiments, the Inter-RAT-Session-Continuity AVP may be of a type Enumerated and may be used to identify whether it is possible to move all flows in an SDF from one RAT to another RAT. The following values may be defined for the Inter-RAT-Session-Continuity AVP:

EUTRAN_TO_WLAN_CONT(0), which implies that SDFs associated with certain PCC rules can be moved from EUTRAN access to WLAN access;

WLAN_TO_EUTRAN_CONT(1), which implies that SDFs associated with certain PCC rules can be moved from WLAN access to EUTRAN access; and WLAN_AND_EUTRAN_CONT(2), which implies that SDFs associated with certain PCC rules can be moved from WLAN access to EUTRAN access and vice-versa (both ways).

It should be noted that absence of the Inter-RAT-Session-Continuity AVP may indicate that flows cannot stay on RAT other than a preferred RAT.

In various embodiments, the Preferred-RAT-Type AVP may be of a type Enumerated and may be used to identify the preferred radio access technology (RAT) on which a given SDF should preferably be placed. For instance, a preferred RAT type for one SDF (e.g., one PCC rule) can be WiFi whereas a preferred RAT for a different SDF (e.g., a different PCC rule) can be LTE. In various embodiments, the following values may be defined for the Preferred-RAT-Type AVP (which may be the same as provided for in TS 29.212, Section 5.3.31):

EUTRAN(1004), which implies that all the flows in a given SDF would be kept on LTE, if available, even if WiFi RAT is also present; and WLAN(0), which implies that all the flows in a given SDF would be kept on WiFi, if available, even if LTE RAT is also present.

It should be noted that when the Preferred-RAT-Type is EUTRAN (e.g., LTE) and Inter-RAT-Session-Continuity is not defined, it is implied that all the flows in a given SDF would be on LTE when LTE is available, and the all the flows in that SDF would be dropped if LTE is not available (e.g., not moved to WiFi (even if available)). Similarly, it should be noted that when the Preferred-RAT-Type is WLAN (e.g., WiFi) and Inter-RAT-Session-Continuity is not defined, it is implied that all the flows in a given SDF would be on WiFi when WiFi is available, and all the flows in that SDF would be dropped if WiFi is not available (e.g., not moved to LTE (even if available)).

TABLE 1, shown below, illustrates various example use cases for different preferred-RAT-Type values in accordance with at least one embodiment of the present disclosure.

TABLE 1

| Preferred RAT | Use case |
| --- | --- |
| EUTRAN with Inter-RAT-Session-continuity | A user may want video flows to be moved to WiFi (when available) and maintain the audio flows on LTE. |
| EUTRAN without Inter-RAT-Session-continuity | In one use case, if a user desires a certain QOS (QCI/ARP) which can be ensured only on LTE, the user may desire a set of flows to be dropped if LTE is not |

TABLE 1-continued

| Preferred RAT | Use case |
|---|---|
| | available rather than using WiFi. In another use case, subscriber policy may be set to maintain a particular kind of application flow on a specific access type, e.g., due to Service Level Agreement (SLA) reasons. |
| WLAN with Inter-RAT-Session-continuity | For any normal internet access, a user may desire to use WiFi (when available). |
| WLAN without Inter-RAT-Session-continuity | A user engaged in a heavy download (e.g., a movie, game, etc.) on WiFi may not desire to continue the download on LTE due to higher charges, which can be incurred. |

As shown in TABLE 1, there can be various motivations for allowing or not allowing Inter-RAT session continuity between RAT types. In various embodiments, Inter-RAT-Session-Continuity settings for various RAT types can be established by a user or by a network operator/service provider. The above uses are just a few of the many motivations for configuring flows for a preferred RAT type. Virtually any other motivations and/or configurations can be used to provide SDF mobility using similar means and methods as described herein, and, thus, are clearly within the scope of the present disclosure.

In various embodiments, the Exception-Rating-Group AVP may be of a type Unsigned32 and may be used in a manner similar to that as the Rating-Group AVP described in RFC 4006, Section 8.29. In various embodiments, the Exception-Rating-Group may be applied for charging a given UE when a preferred RAT type is available for a given bearer, but the UE is not sending uplink (UL) data using the preferred RAT type for that bearer.

In various embodiments, for default and/or dedicated bearers the Inter-RAT-Session-Continuity AVP, the Preferred-RAT-Type AVP, and the Exception-Rating-Group AVP can be sent by PCRF 26 as part of a Charging-Rule-Definition. An example Charging-Rule-Definition, which can be used in one or embodiments described herein is shown in TABLE 2, below.

TABLE 2

```
Charging-Rule-Definition ::= < AVP Header: 1003 >
{ Charging-Rule-Name }
[ Service-Identifier ]
[ Rating-Group ]
[Exception-Rating-Group]
* [ Flow-Information ]
[ Flow-Status ]
[Inter-RAT-Session-Continuity]
[Preferred-RAT-Type]
[ QoS-Information ]
[ PS-to-CS-Session-Continuity ]
[ Reporting-Level ]
[ Online ]
[ Offline ]
[ Metering-Method ]
[ Precedence ]
[ AF-Charging-Identifier ]
* [ Flows ]
[ Monitoring-Key]
[ AF-Signalling-Protocol ]
[ Sponsor-Identity ]
[ Application-Service-Provider-Identity ]
*[ Required-Access-Info ]
* [ AVP ]
```

In one or more embodiments, communication system 10 can provide support for multiple RAT types using Credit Control Request (CCR) message(s), which can be communicated from PCEF 24 to PCRF 26 for changes in RAT types available to UE 12. In various embodiments, PCEF 24 may communicate a CCR to PCRF 26 including an indication of all the RAT types available to UE 12 when a new RAT type becomes available and/or when a given RAT type becomes unavailable. Such communication may be provided so that PCRF 26 can determine whether to move SDFs from one RAT to another RAT. It should be noted that the action of communicating a CCR message to indicate a RAT type availability change may be referred to herein in this Specification as a 'Gx trigger' as the CCR message may be communicated over the Gx interface to PCRF 26 from PGW 22/PCEF 24. It should further be noted that the terms 'accessible' and 'available' may be used herein in this Specification interchangeably and the terms 'inaccessible' and 'unavailable' may be used herein in this Specification interchangeably.

As noted previously, in current deployments, a PCRF maintains PCC rules per UE session and a RAT change trigger is received at the PCRF for the entire IP-CAN session for the UE. Upon receiving the RAT change Gx trigger, the PCRF currently removes all the rules for the UE and reconfigures new rules for the newly available RAT.

In various embodiments, PCRF 26 may include logic to provide for enhanced Gx trigger (e.g., RAT change) processing to enable SDF Mobility for IP flow mobility. In various embodiments, when a RAT change Gx trigger is received for a given PCC rule, PCRF 26 may determine one or more actions for configuring and/or reconfiguring the PCC rule and its associated SDF(s) based on the RAT change, the preferred RAT type for the PCC rule and/or how Inter-RAT session continuity may be defined for the PCC rule. In various embodiments, the configuring and/or reconfiguring can include, among other things, removing an existing PCC rule from PCEF 24 and installing a new PCC rule for a newly available RAT type (depending on configuration) and/or removing an existing PCC rule from PCEF 24 and not installing any new PCC rule, which would mean that the bearer (for the removed PCC rule(s)) may be dropped (e.g., no Inter-RAT session continuity allowed or if session continuity is not possible from one RAT to another RAT, depending on availability/unavailability of a RAT type following the RAT change).

Consider an operational example. During initial attach of UE 12 to PGW 22, PCRF 26 may, for example, configure the PCC rules and accordingly bearers may be created for the corresponding PCC rules. When a RAT change Gx trigger is received for UE 12, PCRF 26 may determine whether to configure or reconfigure any PCC rule(s) and their corresponding SDF(s), which may be affected by the RAT change. In various embodiments, a PCC rule may be affected: (a) if one or more SDF(s) associated with the PCC rule are not on a preferred RAT type, which has become available; or (b) if one or more SDF(s) associated with the PCC rule are on a preferred RAT type, which has become unavailable. In various embodiments, expected actions of PCRF 26 for a RAT change Gx trigger can depend upon the preferred RAT type for an affected rule and can be characterized as follows:

A) If a preferred RAT becomes available, PCRF 26 may move one or more SDF(s) for the affected PCC rule to the preferred RAT by removing the corresponding PCC Rule from current RAT and installing new PCC Rules for preferred RAT;

B) If a preferred RAT becomes unavailable, PCRF 26 may move one or more SDF(s) for the affected PCC rule to an available RAT if session continuity is enabled for the SDF(s) by removing the corresponding PCC Rule from the unavailable RAT and installing new PCC Rules for the available RAT; and/or C) If a preferred RAT becomes unavailable, PCRF 26 and/or PGW 22/PCEF 24 may drop one or more SDF(s) for the affected PCC rule if session continuity is not enabled or not allowed for the available RAT for the SDF(s) by removing the corresponding PCC Rule from the unavailable RAT.

In various embodiments, PGW 22/PCEF 24 may include logic to perform actions for managing the context for UE 12 to enable SDF Mobility for IP flow mobility in light of receiving access requests from multiple RAT types for UE 12. In various embodiments, PGW 22/PCEF 24 should not replace an existing PDN context for UE 12 when a new access request arrives from the UE. For example, when an LTE S5 context exists for UE 12 and a new trusted WLAN S2a PDN access request arrives, PGW 22/PCEF 24 should not replace the S5 context, but instead update the context to also include S2a tunnel information for the WLAN access.

In various embodiments, PCEF 24 (and/or PGW 22) can perform one or more actions based, at least in part, on the availability (accessibility) of a given RAT to enable SDF mobility for IP flow mobility. As noted previously, PCRF 26 may provide to PCEF 24 the preferred RAT type for each configured PCC rule. In various embodiments, PCEF 24 may create bearers for a corresponding PCC rule when a new RAT becomes accessible and/or when an existing RAT becomes inaccessible. When a new RAT becomes accessible, PCEF 24 may initiate a Gx trigger (RAT Change indication) and communicate a list of all the available RAT type(s) to PCRF 26. When a RAT is becomes inaccessible, PCEF 24 may also initiate a Gx trigger (RAT Change indication) and send a list of all the available RAT type(s) to PCRF 26.

In various embodiments, PGW 22/PCEF 24 actions can also include applying charging according the Exception Rating Group if uplink (UL) packets for UE 12 for one of more SDF(s) are received on a RAT, which is not the preferred RAT type even though the preferred RAT is available. In certain embodiments, when a downlink (DL) packet is received at PGW 22, PCEF 24 actions can also include applying one or more SDF filter(s) to the packet to determine whether the DL packet matches any SDF for an available RAT. If so, PGW 22/PCEF 24 may route the DL packet to the available RAT. If none of the filter(s) matches, then the DL packet may be routed on LTE, if available. In some embodiments, the Exception Rating Group can also be used to apply charging when a flow having inter-RAT session continuity enabled is retained in an un-preferred available RAT type.

In certain embodiments, PCRF 26 may install an any-match rule (e.g., a wildcard rule) for WiFi so that unmatched packets may be sent to UE 12 over WiFi if such packets were intended to be communicated over WiFi. Absence of an any-match rule for WiFi would simply mean that the default bearer on LTE could be used for any unmatched packets. In some cases, if the LTE default bearer for UE 12 has specific a SDF associated to it, and PCRF 26 has not installed an any-match rule for WiFi, then unmatched packets may be dropped at PGW 22. In certain embodiments, an any-match rule may be installed for the LTE default bearer to avoid unmatched packet drops when a specific SDF may also be associated to the LTE default bearer.

TABLE 3, shown below summarizes various possible actions, which can be performed by PCRF 26 and/or PGW 22/PCEF 24 based on availability of a preferred RAT type for use cases when the preferred RAT type may be set to LTE for one or more particular SDF(s) and when the preferred RAT type may be set to WiFi for the particular SDF(s). It should be noted that the example actions shown in TABLE 3 are provided for illustrative purposes only and are not meant to limit the broad scope of the present disclosure. It should be understood that other actions could be performed for PCRF 26 and/or PGW 22/PCEF 24 within the scope of the present disclosure.

TABLE 3

|  | Preferred RAT = LTE | Preferred RAT = WiFi |
| --- | --- | --- |
| SDF(s) on LTE and WiFi has become available | No Gx Trigger | PGW/PCEF Action(s): Gx Trigger (LTE, WiFi available). Update mobility context. PCRF Action(s): Remove any associated PCC rule(s) for LTE. Configure new PCC Rules for WiFi to move SDF(s) to WiFi. |
| SDF(s) on WiFi and LTE has become available | PGW/PCEF Action(s): Gx Trigger (LTE, WiFi available). Update mobility context. PCRF Action(s): Remove any associated PCC rule(s) for WiFi. Configure new PCC Rule(s) for LTE to move SDF(s) to LTE | No Gx Trigger |

TABLE 3-continued

| | Preferred RAT = LTE | Preferred RAT = WiFi |
|---|---|---|
| SDF(s) on LTE. LTE has become unavailable and WiFi is available. | PGW/PCEF Action(s): Gx Trigger (WiFi available). Update mobility context. PCRF Action(s): Remove any associated PCC rule(s) for LTE. If EUTRAN to WLAN continuity is enabled and configure new PCC rule(s) to move the SDF(s) to WiFi | N/A When WiFi is already available it is not possible that SDF would be in LTE given that preferred RAT is WiFi. |
| SDF(s) on WiFi. WiFi has become unavailable and LTE is available. | N/A When LTE is already available, it is not possible that SDF is on WiFi when Preferred RAT is LTE | PGW/PCEF Action(s): Gx Trigger (LTE). Update mobility context. PCRF Action(s): Remove PCC rules for WiFi. If WLAN to EUTRAN continuity is enabled, configure new PCC rule(s) to move the SDF(s) to LTE. |

Accordingly, embodiments described herein may provide for IP flow mobility using a single APN and PDN connection. Further embodiments provided herein may provide for IP flow mobility, which may be initiated by the network rather than by a given UE.

Figure 2:
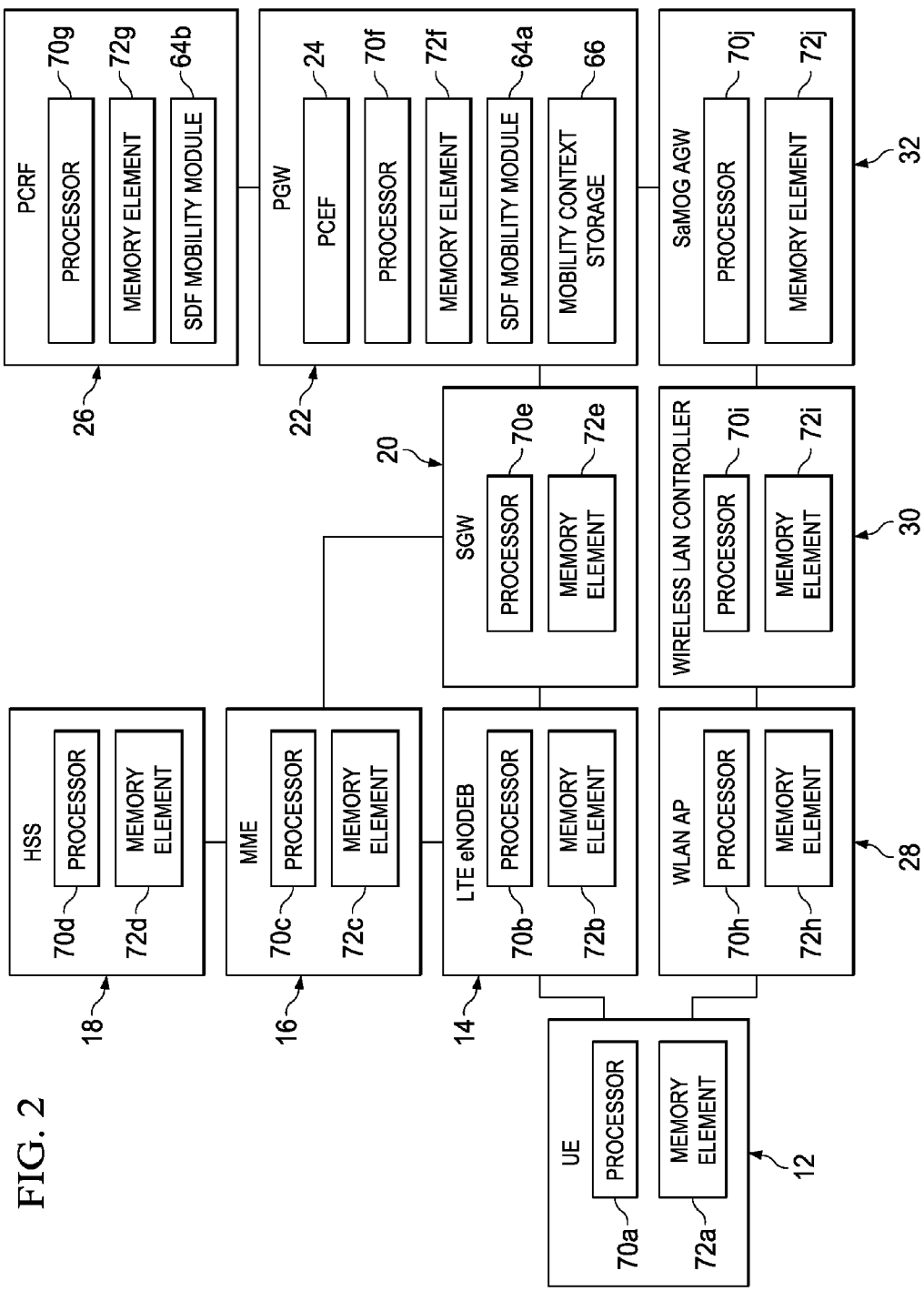
FIG. 2 is a simplified block diagram illustrating additional details associated with one potential embodiment of the communication system.

Turning to FIG. 2, FIG. 2 is a simplified block diagram illustrating additional details associated with one potential embodiment of communication system 10. FIG. 2 includes UE 12, LTE eNodeB 14, MME 16, HSS 18, SGW 20, PGW 22, PCRF 26, WLAN AP 28, wireless LAN controller 30 and SaMOG AGW 32 of communication system 10. Each of these elements may include a respective processor 70a-70j and a respective memory element 72a-72j. PGW 22 may additionally include PCEF 24, an SDF mobility module 64a and mobility context storage 66. PCRF 26 may additionally include SDF mobility module 64b. SDF mobility module 64a may be configured to execute various tasks of PGW 22 and/or PCEF 24 to implement the various SDF mobility functions as further described herein to achieve IP flow mobility for communication system 10. Mobility context storage 66 may be configured to store mobility context information for UE 12 including, but not limited to, RAT type availability and PCC rules for one or more SDF(s) for one or more user equipment such as UE 12 as further described herein. SDF mobility module 64b may be configured to execute various tasks of PCRF 26 to implement the various SDF mobility functions as further described herein to achieve IP flow mobility for communication system 10.

Hence, appropriate software and/or hardware can be provisioned in UE 12, LTE eNodeB 14, MME 16, HSS 18, SGW 20, PGW 22, PCRF 26, WLAN AP 28, wireless LAN controller 30 and SaMOG AGW 32 in order to facilitate IP flow mobility in the network environment of communication system 10. Note that in certain examples, certain databases (e.g., for storing mobility context, RAT availability, preferred RAT type for one or more SDF(s), preferred RAT type for a default bearer, combinations thereof or the like) can be consolidated with memory elements (or vice versa), or the storage can overlap/exist in any other suitable manner.

In one example implementation, UE 12, LTE eNodeB 14, MME 16, HSS 18, SGW 20, PGW 22, PCRF 26, WLAN AP 28, wireless LAN controller 30 and SaMOG AGW 32 are network elements, which are meant to encompass network appliances, servers, routers, switches, gateways, bridges, loadbalancers, firewalls, processors, modules, or any other suitable device, component, element, or object operable to exchange information that facilitates or otherwise helps to provide for IP flow mobility. In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 10, each of UE 12, LTE eNodeB 14, MME 16, HSS 18, SGW 20, PGW 22, PCRF 26, WLAN AP 28, wireless LAN controller 30 and SaMOG AGW 32 can include memory elements for storing information to be used in achieving IP flow mobility, as outlined herein. Additionally, each of these devices may include a processor that can execute software or an algorithm to perform the IP flow mobility activities as discussed in this Specification. These devices may further keep information in any suitable memory element [e.g., random access memory (RAM), read only memory (ROM), an erasable programmable read only memory (EPROM), an application specific integrated circuit (ASIC), etc.], software, hardware, or in any other suitable component, device, element, or object where appropriate and based on particular needs. Any of the memory items discussed herein should be construed as being encompassed within the broad term 'memory element'. In various embodiments, the information being tracked or sent to UE 12, LTE eNodeB 14, MME 16, HSS 18, SGW 20, PGW 22, PCRF 26, WLAN AP 28, wireless LAN controller 30 and SaMOG AGW 32 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and user equipment can also include suitable interfaces for receiving, transmitting, and/or otherwise communicating data or information in a network environment.

Note that in certain example implementations, the IP flow mobility activities as outlined herein may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIG. 2] can store data or information used for the operations described herein. This includes the memory elements being able to store software, logic, code, or processor instructions that are executed to carry out the activities described herein.

A processor can execute any type of instructions associated with the data or information to achieve the operations detailed herein. In one example, processors [as shown in FIG. 2] can transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable programmable read only memory (EEPROM)) or an ASIC that includes digital logic, software, code, electronic instructions, or any suitable combination thereof.

Turning to FIG. 3A-3C, FIGS. 3A-3C are simplified flow diagrams 300A-300C illustrating potential flows and activities associated with providing SDF mobility to enable IP flow mobility in accordance with one potential embodiment of the present disclosure. In one example embodiment, these flows and activities may be carried out via UE 12, MME 16, SGW 20, PGW 22 (including PCEF 24), PCRF 26 and SaMOG AGW 32.

As illustrated in flow diagram 300, at 301, UE 12 is attached via EUTRAN (e.g., over LTE) to a given APN identified as 'apn1.name.com'. At 302, it is assumed for the present flows and activities that PGW 22 and PCRF 26 have an active IP-CAN session and that PCRF 26, during the initial attach of UE 12 to LTE, has communicated a credit control answer update (CCA-U) message including, at least in part, an Inter-RAT-Session-Continuity AVP, a preferred-RAT-Type AVP and an Exception-Rating-Group AVP for each SDF for the LTE access network. At 303, UE 12 is allocated an Internet protocol (IP) address, IP1, and has two IP bearers defined as shown at 304-308.

At 304, a default LTE bearer having an evolved bearer identity (EBI)=5 is defined for uplink (UL) and downlink (DL) packets for UE 12. At 305, a first PCC rule (PCC Rule 1) is configured to establish an SDF 40 for the default LTE bearer having a preferred RAT type=WiFi and session continuity set to TRUE (e.g., Inter-RAT session continuity is allowed for SDF 40 if WiFi access is unavailable). At 306 a second PCC rule (PCC Rule 2) is configured to establish an SDF 60 for the default LTE bearer having a preferred RAT type=LTE and session continuity set to FALSE (e.g., Inter-RAT session continuity is not allowed for SDF 60 if LTE access is unavailable). At 307, a dedicated LTE bearer having an EBI=6 is defined for UL and DL packets for UE 12. At 308, a third PCC rule (PCC Rule 3) is configured to establish an SDF 80 for the dedicated LTE bearer having a preferred RAT type=WiFi and session continuity set to TRUE. Accordingly, at 309, PGW 22 has UE context in LTE as following 301-308. It should be understood that uplink (UL) packets are packets coming from UE 12 toward PGW 22 and downlink (DL) packets are packets sent toward UE 12 from PGW 22.

Figure 4:
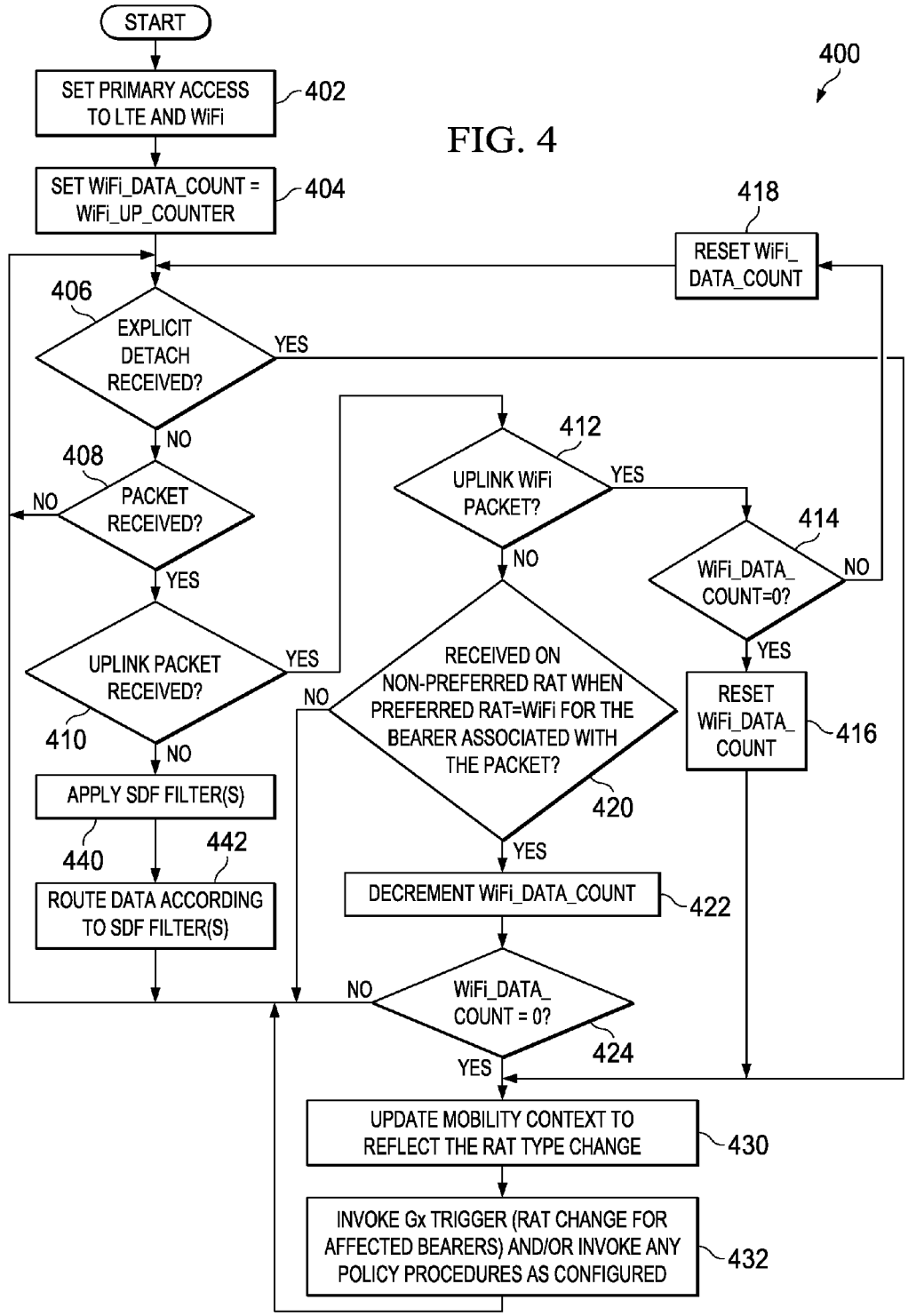
FIG. 4 is a simplified flow diagram illustrating example operations associated with determining WiFi availability for service data flow mobility to enable IP flow mobility in accordance with one potential embodiment of the present disclosure.

At 310, it is assumed that UE 12 turns on its WiFi capabilities. At 311, radius accounting is initiated for UE 12 via SaMOG AGW 32. At 312, SaMOG AGW 32 communicates a create session request (CSR) to PGW 22. The CSR may include the static IP-IP1 allocated for UE 12, APN=apn1.name.com, EBI=7, RAT type=WLAN, interface type=S2a-GTP and an IFOM indication to signal to PGW 22/PCEF 24 that the PDN connection is for an IFOM scenario as opposed to a handover scenario. In certain embodiments, the IFOM indication can be provided by toggling a handover indication (HI) to identify whether a CS request pertains to a handover related scenario or an IFOM related scenario. At 313, PGW 22 may process the CSR to determine whether WiFi is available or not accessible. Certain embodiments may provide a heuristic process to determine whether WiFi is available or not accessible (e.g., not available). FIG. 4, discussed in further detail below, illustrates a heuristic process to determine whether WiFi is available according to one potential embodiment of the present disclosure. It should be noted that, regardless of the preferred RAT type setting for one or more SDF(s), if any UL packet on WiFi (e.g., via WLAN access) is received, it is assumed that WiFi is working (e.g., available/accessible).

Thus at 314-317, a bearer may be created on WiFi and various PCC rules may be configured and/or reconfigured accordingly. At 314, PGW 22 may communicate a credit control request initial (CCR-I) to PCRF 26 for a WLAN dedicated bearer having EBI=7. Recall, PGW 22/PCEF 24 may use a CCR to provide a Gx trigger (RAT change) to PCRF 26 indicating available RAT types for a given UE, such as, for example, UE 12. Accordingly, the CCR-I may include EBI=7 for the dedicated bearer, the interface type=S2a-GTP and an indication of available RAT types including LTE and WLAN.

At 315, PCRF 26 process the Gx trigger (RAT change indication) based on the available RAT types (e.g., LTE and WiFi) and, at least in part, on the indicated Preferred-RAT-Type AVP and Session-Continuity AVP for each of SDF 40, SDF 60 and SDF 80 to determine that both of SDF 40 and SDF 80 should be moved to WLAN access and SDF 60 on the default LTE bearer should be retained on LTE. At 316, PCRF communicates a credit control answer initial (CCR-I) with Gx-Session PCC Rules for EBI=7, WLAN. At 317, PGW 22/PCEF 24 and PCRF 26 interact to modify the rules previously configured at 305, 306 and 308 in order to move SDF 40 and SDF 80 to WLAN access. At 318, PGW 22 communicates a CSR Response having the allocated IP=IP1 to SaMOG AGW 32, which is communicated back to UE 12 over WiFi via a connection response indicating attachment via WLAN access. At 319, PGW 22 has UE context in LTE and WiFi. Accordingly, at 320 UE 12 is attached to apn1.name.com via EUTRAN and WLAN.

The bearers, PCC Rules and corresponding SDF configurations for UE 12 are shown at 321-325. It should be noted that the bearers, PCC Rules and SDF configurations shown at 321-325 may be configured and/or reconfigured at 317, as discussed previously. Thus, 321-325 merely illustrate the result of the configuring and/or reconfiguring of bearers, PCC rules and SDF configurations performed at 317.

Default LTE bearer EBI=5 is shown at 321 and has been modified to include only PCC Rule 2 having corresponding SDF 60 configured accordingly at 322 (e.g., the same as shown at 305). Dedicated WLAN bearer EBI=7 is shown at 323. At 324, PCC Rule 1 has been removed from the LTE default bearer and moved to the dedicated WLAN bearer having SDF 40 configured thereon. Further, dedicated LTE bearer EBI=6, which was previously created at 307 for PCC Rule 3 having the SDF 80 configuration, has been removed as a result of the RAT availability change. Instead PCC Rule 3 has been moved to the dedicated WLAN bearer having SDF 80 configured thereon, as shown at 325.

Following the modifications to bearers, PCC Rules and SDF configurations, PGW 22 may accept uplink (UL) packets from UE 12 on either LTE or WiFi. However, it should be noted that, in cases when the UE may communicate UL packets for a particular bearer on a non-preferred RAT type, PGW 22/PCEF 24 may apply charging to the UE based on the exception rating group for the UE as indicated via the Exception-Rating-Group AVP, which may be configured by a network operator. For downlink (DL) packets, PGW 22/PCEF 24 may forward or route the packets to their corresponding SDF on the appropriate SDF RAT type. Thus, as shown in FIGS. 3A-3C, communication system 10 may provide for SDF mobility for a given UE, such as UE 12.

Referring now to FIG. 4, FIG. 4 is a simplified flow diagram 400 illustrating example operations associated with determining WiFi availability for SDF mobility to enable IP flow mobility in accordance with one potential embodiment of the present disclosure. As discussed above, PGW 22/PCEF 24 may determine whether WiFi is available or not accessible (e.g., not available), which, based on the availability, may invoke a Gx trigger (e.g., CCR (update or initial) message) to be communicated to PCRF 26 indicating available RAT types for a given UE, such as, for example UE 12. In accordance with various embodiments, PGW 22/PCEF 24 may maintain a single context, referred to as mobility context for UE 12, in which primary access type(s) (e.g., available RAT types) are designated and/or updated for UE 12. The primary access type(s) are what PGW 22/PCEF 24 uses to forward or route traffic associated with UE 12 on both uplink (UL) and downlink (DL) directions. Again, it should be understood that uplink (UL) packets are packets coming from UE 12 toward PGW 22/PCEF 24 and downlink (DL) packets are packets sent toward UE 12 from PGW 22/PCEF 24. In certain embodiments, PGW 22/PCEF 24 may update the mobility context for UE 12 based on determinations of changes in RAT type availability. In certain embodiments, the mobility context can be used by PGW 22/PCEF 24 to ensure appropriate forwarding or routing of packets based on access availability (e.g., RAT type availability, such as WiFi, 4G, LTE, 3G, etc.), which is indicated in the context for UE 12.

At any time, UE 12 may attach to both LTE and WiFi. Thus, processing may start at 402 where PGW 22/PCEF 24 may set both access types (e.g., LTE, WiFi) for the mobility context of UE 12 to primary when UE 12 attaches to both access types. As noted above, there is a distinction between the context and access for UE 12. At 404, PGW 22/PCEF 24 defines a new variable referred to as 'wifi_data_count' whose initial value can be set to a configurable value='WIFI_UP_COUNTER'. In a particular example, WIFI_UP_COUNTER is set to an initial value of 10.

At 406, PGW 22/PCEF 24 determines whether an explicit detach has been received for UE 12 for either RAT type. If so, operations may continue to 430 where PGW 22/PCEF 24 may update the mobility context for UE to reflect the RAT type change (e.g., mark a corresponding RAT type as unavailable). Operations may continue to 432 wherein PGW 22/PCEF 24 may invoke a Gx trigger (e.g., a CCR message indicating a RAT change for one or more affected bearers) and/or may invoke any configured policy procedures for UE 12 such as, for example, charging policies and/or QoS policies; operations may then return to 406.

If it is determined at 406 that an explicit detach has not been received, the operations continue to 408, in which PGW 22/PCEF 24 determines whether a packet has been received. If no packet has been received, the operations return to 406. If a packet has been received, the operations continue to 410. At 410, PGW 22/PCEF 24 determines whether the received packet is an uplink (UL) packet. If the received packet is an uplink packet, the operations continue to 412, in which PGW 22/PCEF 24 determines if the UL has been received on WiFi. If so, PGW 22/PCEF 24 determines at 414 whether wifi_data_count is equal to zero (0). If wifi_data_count is not equal to zero, PGW 22/PCEF 24 resets wifi_data_count back to the initial value of WIFI_UP_COUNTER at 414 and the operations return to 406. If wifi_data_count is equal to zero, the operations continue to 416, in which PGW 22/PCEF 24 resets wifi_data_count back to the initial value of WIFI_UP_COUNTER and the operations continue 430 where PGW 22/PCEF 24 may update the mobility context for UE to reflect the RAT type change (e.g., mark a WiFi as unavailable). The operations may continue to 432 as describe previously and return to 408.

If it is determined that the UL packet has not been received on WiFi, the operations continue to 420, in which PGW 22/PCEF 24 determines whether the UL packet has been received on a non-preferred RAT while the preferred RAT is set to WiFi for a particular bearer. If the UL packet is received on a non-preferred RAT while the preferred RAT for the particular bearer is set to WiFi, PGW 22/PCEF 24 decrements wifi_data_count by one (1) at 422 and the operations continue to 424. Otherwise, the operations return to 406.

Consider various examples to illustrate the decrementing. Say, for example, that there is a default bearer with an SDF having a preferred RAT type set to WiFi and an UL packet for the default bearer is received on LTE. In this case, PGW 22/PCEF 24 would decrement wifi_data_count. In another example, say there is a dedicated bearer with an SDF having a preferred RAT type set to LTE and an UL packet for the dedicated bearer is received on LTE, then, in this case, PGW 22/PCEF 24 would not decrement wifi_data_count. It should be noted that, regardless of the preferred RAT type setting for one or more SDF(s), if any UL packet is received on WiFi (e.g., via WLAN access), then PGW 22/PCEF 24 may assume that WiFi is working (e.g., available/accessible) and the wifi_data_count may be reset to the value of WIFI_UP_COUNTER, as shown at 418.

Following the decrementing at 422, PGW 22/PCEF 24 determines at 424 whether wifi_data_count is equal to zero. If so, the operations continue to 430 wherein PGW 22/PCEF 24 may update the mobility context of UE 12 to reflect the RAT type change (e.g., WiFi access marked as unavailable) and, at 432, may invoke a Gx trigger (e.g., a CCR message indicating a RAT change for one or more affected bearers) and/or may invoke any configured policy procedures for UE 12 such as, for example, charging policies and/or QoS policies; operations may then return to 406.

If it is determined at 410 that the received packet is not an uplink packet then the received packet is a downlink (DL) packet and the operations continue to 440, in which PCEF 24 applies appropriate SDF filter(s) to the DL packet based on the settings for each of the one or more SDF(s) configured for various bearers to determine an appropriate SDF for communicated the DL packet to UE 12. At 442, based on the determination, PGW 22/PCEF 24 routes the DL data according to the SDF filter(s) and the operations return to 406.

In essence, embodiments of the above described operations may key off of uplink packets received from UE 12 and/or an explicit detach for UE 12 to determine whether WiFi is available or not accessible (e.g., not available) to the UE. For example, if WiFi may be switched off for the UE at some point or if the UE may be out of range of a given WLAN AP, such as WLAN AP 28, then UE 12 may communicate UL packets toward PGW 22/PCEF 24 using LTE, regardless of the preferred RAT type for a particular SDF. Following such behavior, PGW 22/PCEF 24 may determine using the operations discussed that WiFi is unavailable or not accessible by the UE, which can invoke a Gx trigger indicating the RAT type change as well as one or more bearer modifications, PCC rule modifications and/or SDF configurations.

Figure 5:
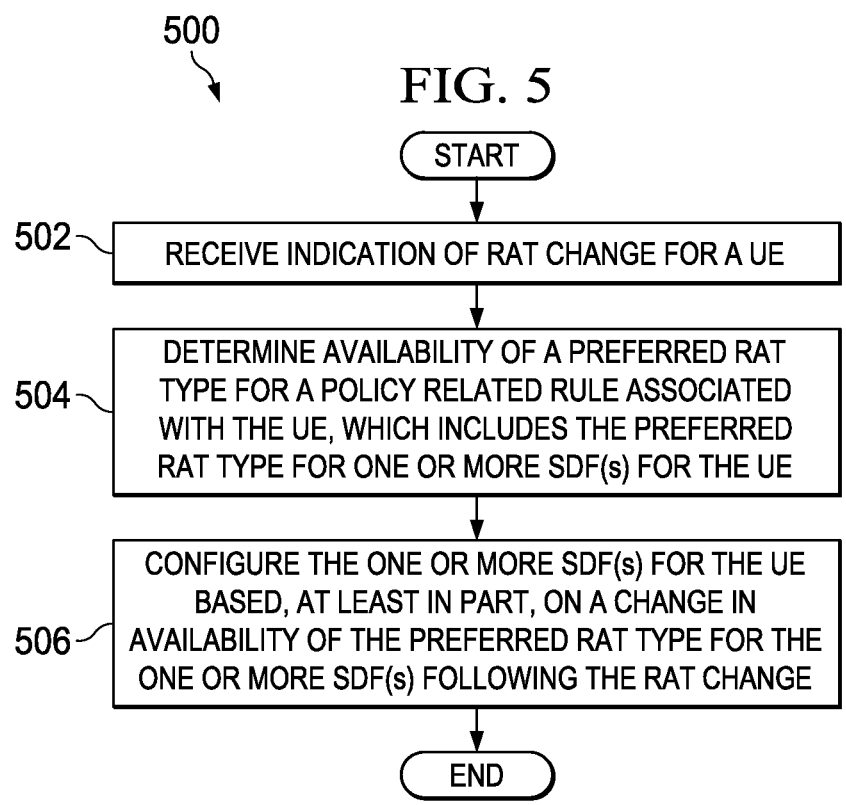
FIGS. 5-7 are a simplified flow diagrams illustrating example operations associated with providing service data flow mobility to enable IP flow mobility in accordance with various potential embodiments of the present disclosure.

Referring now to FIG. 5, FIG. 5 is a simplified flow diagram 500 illustrating example operations associated with providing service data flow mobility to enable IP flow mobility in accordance with one potential embodiment of the present disclosure. At any time, a given UE, such as UE 12, may attach to both LTE and WiFi, based on the availability of each RAT type. Upon determining a change in RAT type for UE 12, PGW 22/PCEF 24 may invoke a Gx trigger to be communicated to PCRF. As shown at 502, PCRF 26 may receive an indication of a RAT change for a given UE, such as UE 12. In certain embodiments, the indication of the RAT change may be communicated in the Gx trigger (e.g., a CCR message) communicated from including changes in available RAT types for UE 12. At 504, PCRF determines the availability of a preferred RAT type for a policy related rule, which includes the preferred RAT type for one or more SDF(s) for the UE. At 506, PCRF 26 and PGW/PCEF 24 may configure the one or more SDF(s) for the UE based, at least in part on a change in availability of the preferred RAT type following the RAT change. In certain embodiments, a policy related rule can be a PCC rule.

In general, communication system 10 may provide for SDF mobility to enable IP flow mobility by configuring and/or reconfiguring one or more SDF(s) affected by a change in RAT type by removing, moving, and/or installing PCC rules and their associated SDF(s) among different access bearers for multiple access types based, at least in part, on the availability and/or unavailability of a preferred RAT type and inter-RAT session continuity indication, which can be configured for different PCC rules/SDF(s).

Figure 6:
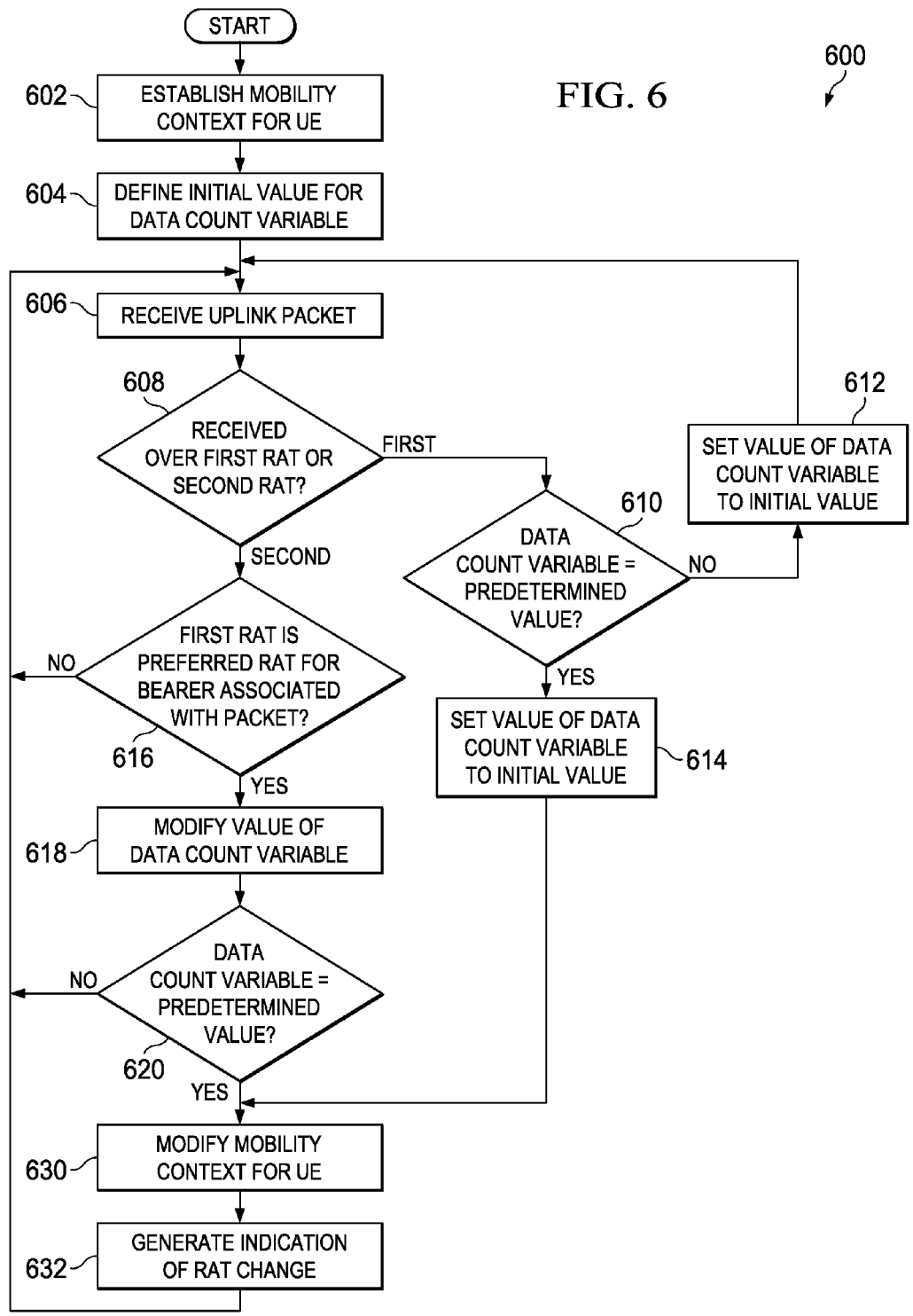

Referring now to FIG. 6, FIG. 6 is a simplified flow diagram 600 illustrating other example operations associated with providing service data flow mobility to enable IP flow mobility in accordance with one potential embodiment of the present disclosure. In 602, PGW 22/PCEF 24 may establish a mobility context associated with UE 12. The mobility context may include designation(s) one of or more RAT type(s) set to primary access type(s) for UE 12, based on the availability of the one or more RAT type(s). Recall, at any time, a given UE, such as UE 12, may attach to LTE and/or WiFi, based on the availability of each RAT type. In one or more embodiments, primary access is the access over which PGW 22/PCEF 24 forwards and/or routes packets in the downlink (DL) to UE 12 and accepts packets in the uplink (UL) from UE 12.

In a particular embodiment, a first RAT type is associated with a WLAN access type, such as WiFi access. In a particular embodiment, a second RAT type is associated with a EUTRAN access type such as LTE access. At 604, PGW 22/PCEF 24 defines an initial value (e.g., a value=WIFI_UP_COUNTER) for a data count variable (e.g., wifi_data_count). The data count variable is representative of a number of consecutive uplink packets received from UE 12 over the second RAT type when the first RAT type is the preferred RAT type for the bearer associated with the packets. For example, when WiFi is the preferred RAT type for a bearer, but uplink packets for the bearer are received over LTE.

At 606, PGW 22/PCEF 24 receives at least one uplink packet associated with UE 12 from at least one of the first RAT type and the second RAT type. In 608, PGW 22/PCEF 24 determines whether the uplink packet is received over the first RAT type or the second RAT type. If it is received over the first RAT type, the operations continue to 610, in which PGW 22/PCEF 24 determines whether the data count variable is equal to a predetermined value. If the data count variable is not equal to the predetermined value, the operations continue to 612, in which PGW 22/PCEF 24 sets the value of the data count variable to the initial value at 612 and operations return to 606. If the data count is equal to the predetermined value, operations continue to 614, in which PGW 22/PCEF 24 sets the value of the data count variable to the initial value and operations continue to 630. In one example, the operations in 610 and 614 may be representative of receiving an uplink packet over the first RAT type (e.g., WiFi access) when the first RAT type has been previously marked unavailable for the UE.

At 630, PGW 22/PCEF 24 modifies the mobility context for UE 12. In a particular embodiment, modifying the mobility context can include marking the first RAT type and/or the second RAT type as available or accessible and modifying the primary access type(s) for UE 12 based on the corresponding RAT type availability. In another particular embodiment, modifying the mobility context can include marking the first RAT type and/or the second RAT type as unavailable or not accessible and modifying the primary access type(s) for UE 12 based on the corresponding RAT type availability. At 632, PGW 22/PCEF 24 generates an indication of a change in RAT type availability. In a particular embodiment, generating the indication can include invoking a Gx trigger (e.g., a CCR message) communicated to PCRF 26 indicating available RAT types for UE 12.

If it is determined at 608 that the UL packet is received over the second RAT type, operations continue to 616, in which PGW/PCEF determines whether the first RAT type (for example, WiFi) is the preferred RAT type for the bearer associated with the packet. If not, operations return to 606. If the first RAT type is the preferred RAT type for the bearer, operations continue to 618, in which PGW 22/PCEF 24 modifies the value of the data count variable. In a particular embodiment, modifying the value can include decrementing the value of the data count variable.

At 620, PGW 22/PCEF 24 determines whether the data count variable is equal to the predetermined value. If it is not equal to the predetermined value, operations return to 606. If it is determined that the data count variable is equal to the predetermined value, operations continue to 630. At 630, as discussed previously, PGW 22/PCEF 24 modifies the mobility context for UE 12. At 632, PGW 22/PCEF 24 generates an indication of a change in RAT type availability.

Figure 7:
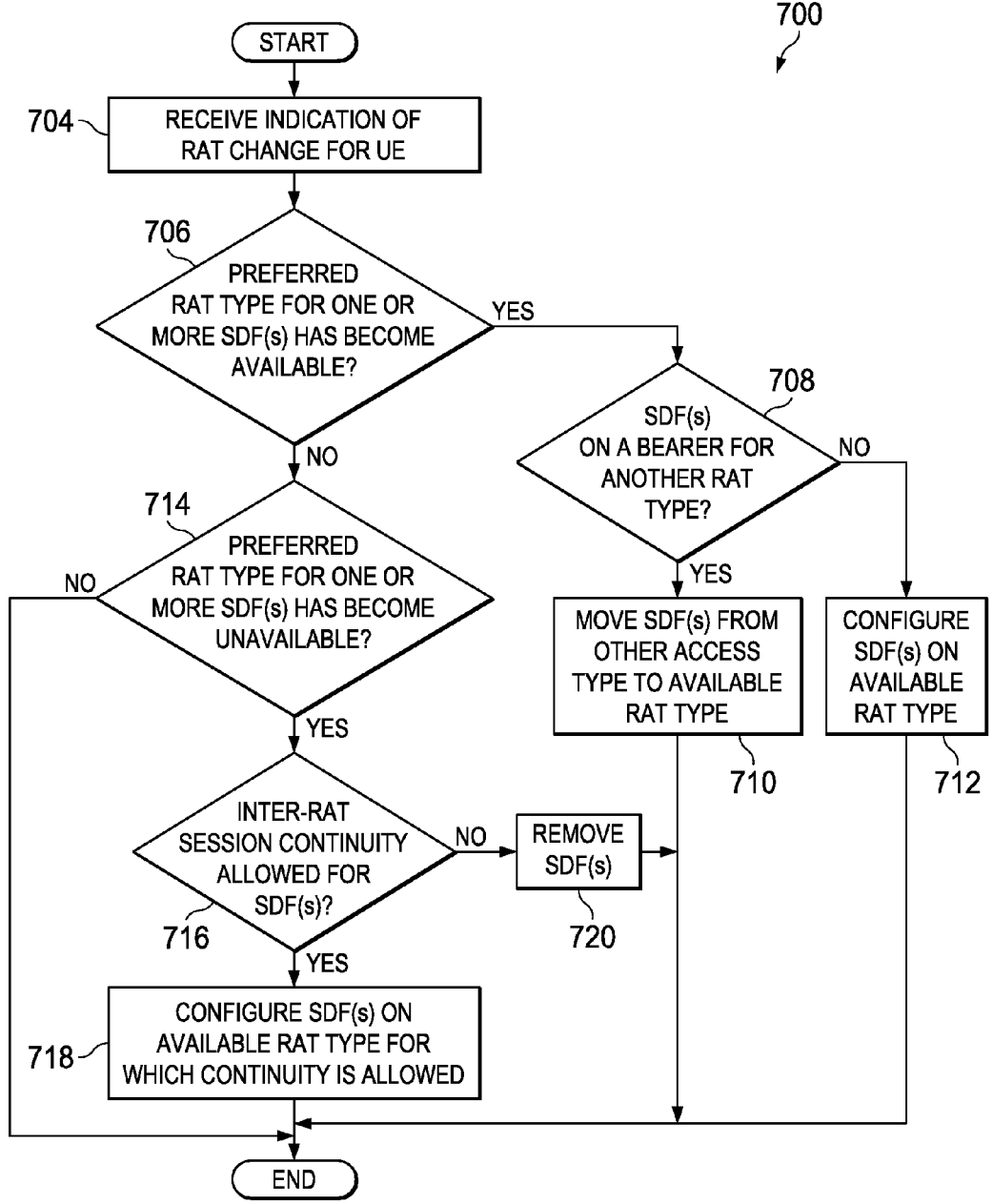

Referring now to FIG. 7, FIG. 7 is a simplified flow diagram 700 illustrating other example operations associated with providing service data flow mobility to enable IP flow mobility in accordance with one potential embodiment of the present disclosure. At any time, a given UE, such as UE 12, may attach to both LTE and WiFi, based on the availability of each RAT type. Upon determining a change in RAT type for UE 12, PGW 22/PCEF 24 may generate an indication of a RAT change for UE 12. In certain embodiments, generating of an indication of a RAT change may include invoking a Gx trigger (e.g., a CCR message) including an indication of available RAT types for UE 12. As shown at 704, PCRF 26 receives an indication of a RAT change for a given UE, such as UE 12.

At 706, PCRF 26 determines whether a preferred RAT type for one or more SDF(s) for UE 12 has become available, based on the RAT change indication received from PGW 22/PCEF 24. If so, operations continue to 708, in which PCRF 26 determines whether the one or more SDF(s) are on a bearer for another access type. If so, at 710, PCRF 26 and PGW 22/PCEF 24 move the one or more SDF(s) from the other RAT type to the available (preferred) RAT type for the one or more SDF(s). If it is determined that the one or more SDF(s) are not being serviced via another RAT type, then at 712, PCRF 26 and PGW 22/PCEF 24 configure the one or more SDF(s) on the available (preferred) RAT type.

If it is not determined at 706 that the preferred RAT for one or more SDF(s) has become available, the operations continue to 714, in which PCRF 26 determines whether a preferred RAT for one or more SDF(s) has become unavailable. If the indicated RAT change neither indicates the a preferred RAT type for one or more SDF(s) has become available or unavailable, PCRF 26 can assume that the RAT change does not affect one or more SDF(s) and the operations may end. For example, a preferred RAT types for one or more SDF(s) could be LTE, but WiFi availability for the UE may change between available/unavailable, which may invoke one or more Gx triggers to be communicated to PCRF 26. However, such RAT type changes would not affect the one or more SDF(s) having a preferred RAT type set to LTE.

If it is determined at 714 that the preferred RAT type for one or more SDF(s) has become unavailable, the operations may continue to 716. At 716, PCRF 26 determines for the one or more SDF(s) whose preferred RAT type has become unavailable whether inter-RAT session continuity is allowed and/or whether it is allowed for a RAT type, which is still available to the UE. If, for one or more SDF(s), it is determined based, at least in part, on the Inter-RAT-Session-Continuity AVP for the one or more SDF(s) that inter-RAT session continuity is allowed and/or allowed for an available RAT type, PCRF 26 and PGW 22/PCEF 24 may configure the one or more SDF(s) on the available RAT type for which inter-RAT session continuity is allowed at 718. If, for one or more SDF(s), it is determined based, at least in part, on the Inter-RAT-Session-Continuity AVP for the one or more SDF(s) that inter-RAT session continuity is not allowed and/or is not allowed for an available RAT type, PCRF 26 and PGW 22/PCEF 24 may, at 720, remove the one or more associated SDF(s) altogether.

Thus, as shown in FIG. 7, communication system 10 may provide for SDF mobility to enable IP flow mobility by configuring and/or reconfiguring one or more SDF(s) based, at least in part, on the availability and/or unavailability of a preferred RAT type and inter-RAT session continuity indication, which can be configured for different PCC rules/SDF (s). Some particular embodiments may provide for one or more of the following advantages: provide for IP flow mobility with a single APN and PDN connection; and provide for IP flow mobility initiated by the network and not the UE.

Figure 8:
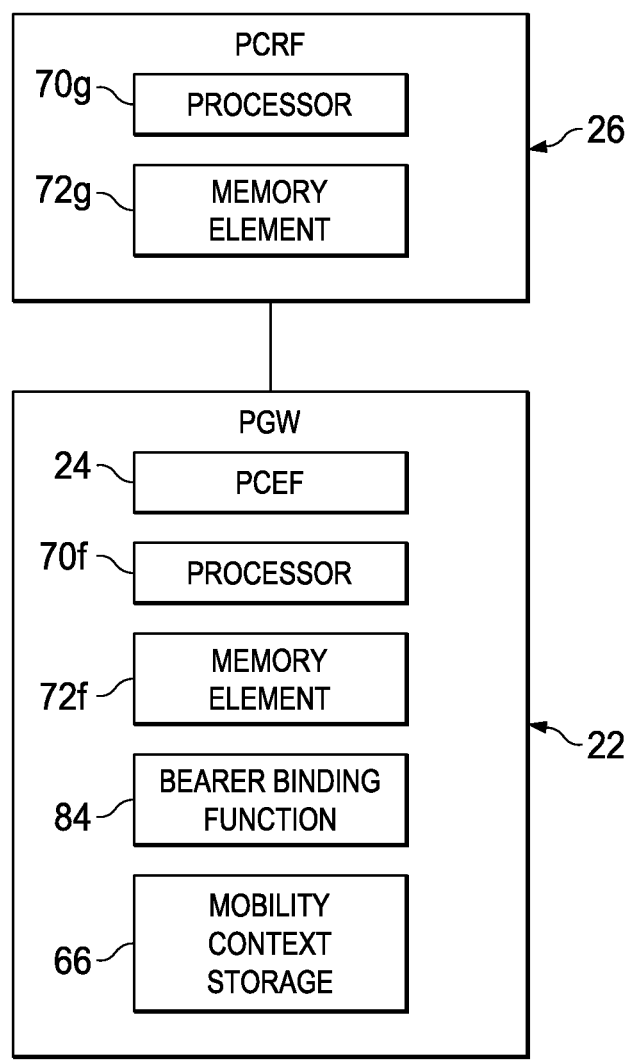
FIG. 8 is a simplified block diagram illustrating other details associated with one potential embodiment of the communication system.

Turning to FIG. 8, FIG. 8 is a simplified block diagram illustrating other details associated with one potential embodiment of the communication system. FIG. 8 includes PGW 22 and PCRF 26. PGW 22 includes PCEF 24, processor 70*f*, memory element 72*f*, mobility context storage 66 and a bearer binding function 84. PCRF 26 includes processor 70*g* and memory element 72*g*.

Before detailing some of the operational aspects of FIG. 8, certain contextual information is provided to understand common characteristics of bearer binding mechanisms as typically operated in commercial architectures. Such information is offered earnestly and for teaching purposes only and, therefore, should not be construed in a way to limit the broad applications and teachings of the present disclosure. In general, the A bearer binding mechanism is the association of a PCC rule and a QoS rule to an IP-CAN bearer within a given IP-CAN Session. The bearer binding mechanism in PCEF is typically based on a combination of a QoS class identifier (QCI) and an evolved allocation and retention priority (eARP) setting. As there are multiple access technologies involved in an IP flow mobility (IFOM) scenario (e.g., EUTRAN and WiFi), the typical QCI, eARP combination may not provide a unique identifier for binding these rule. For example, when the PCRF sends the rules to the PGW/PCEF identifying the bearer using QCI, EARP, the PGW/PCEF does not know whether to bind these rules on WiFi or on EUTRAN.

In accordance with various embodiments described herein, communication system 10 can overcome these shortcomings (and others) by providing a new bearer binding function, which can differentiate the bearers on the WiFi and those on LTE based on a RAT type identifier being provided as an additional key in the identification of a bearer on the PCC interface (e.g., the Gx interface). In certain embodiments a bearer (default or dedicated) can be identified by QCI, eARP and RAT type on the PCC interface. PGW 22 may include bearer binding function (BBF) 84, which may provide enhanced functionality to match rules to bearers based on QCI, eARP and RAT type to perform bearer binding. By providing for the additional RAT type key, PGW 22/PCEF 24 may support handling for multiple default bearers (e.g., one default bearer on LTE and another default bearer on WLAN) to enable IP flow mobility for communication system 10. PGW 22 may accept uplink (UL) packets on both WLAN and LTE to enable IP flow mobility.

In certain embodiments, for default bearers, the Default-EPS-Bearer-QoS AVP, as defined in 3GPP TS 29.212 can be updated to additionally include RAT-Type as a new parameter that may provide a corresponding RAT type to be used in matching rules to a default bearer. In certain embodiments, for dedicated bearers, the QoS-Information AVP for the Charging-Rule-Definition AVP, as defined in 3GPP TS 29.212, can be updated to additionally include RAT-Type as a new parameter that may provide a corresponding RAT type to be used in matching rules to a dedicated bearer. The RAT-Type parameter may be set to indicate a RAT type such as EUTRAN, WLAN, etc. based on the definition(s) provided in TS 29.212. The inclusion of the RAT-Type parameter in the Default-EPS-Bearer-QoS AVP and the QoS-Information AVP is illustrated in TABLE 4, below.

TABLE 4

Default-EPS-Bearer-QoS::= < AVP Header: 1049 > //For default bearer(s)

TABLE 4-continued

```
[ QoS-Class-Identifier ]
[ Allocation-Retention-Priority ]
[RAT-Type]                        //New parameter
* [ AVP ]
QoS-Information ::= < AVP Header: 1016 > //For dedicated bearer(s)
[ QoS-Class-Identifier ]
[ Max-Requested-Bandwidth-UL ]
[ Max-Requested-Bandwidth-DL ]
[ Guaranteed-Bitrate-UL ]
[ Guaranteed-Bitrate-DL ]
[ Bearer-Identifier ]
[ Allocation-Retention-Priority]
[ APN-Aggregate-Max-Bitrate-UL]
[RAT-Type]                        //New Parameter
```

In certain embodiments, the solution provided by communication system 10 may further include defining a new default-EPS-Preferred-RAT-Type AVP that may be used to identify, based on a preferred RAT type, a preferred default bearer for handling (e.g., forwarding or routing) DL data. In such embodiments, PGW 22/PCEF 24 may apply the default-EPS-Preferred-RAT-type received from PCRF 26 for downlink (DL) packets to route the packets on the preferred default bearer RAT type. In certain embodiments, DL data can be routed according to the default bearer preferred RAT type if the DL data does not match a rule configured for any other bearer.

In one or more embodiments, the default-EPS-Preferred-RAT-Type AVP may be returned by HSS 18 to PCRF 26 in a DIAMETER-based Server Assignment Answer (SAA) on the Sh interface. In some embodiments, PCRF 26 can indicate to PGW 22/PCEF 24 to provide a re-request of PCC rule for changes in default-EPS-Preferred-RAT-Type, by communicating an Event-Report-Indication AVP to PGW 22/PCEF 24 including an Event-Trigger AVP of a new type DEFAULT_EPS_PREFERRED_RAT_CHANGE (46). The new type of Event-Trigger can be used to subscribe PGW 22/PCEF 24 to re-request PCC rules from PCRF 26 for changes in default-EPS-Preferred-RAT-type. In one or more embodiments, PGW 22/PCEF 24 may subscribe to such events using a DIAMETER-based Re-Authorization Request (RAR) command.

Table 5, shown below, illustrates an example default-EPS-Preferred-RAT-Type AVP and an example Event-Trigger AVP addition, which can be used in various embodiments described herein.

TABLE 5

```
[default-EPS-Preferred-RAT-Type] ::= < AVP header: 2013 >
[ RAT-Type ]     // Based on TS 29.212 definition of RAT-Type
Event-Trigger AVP :
     DEFAULT_EPS_PREFERRED_RAT_CHANGE (46)     //NEW EVENT
```

In certain embodiments, the solution provided by communication system 10 may include extending the credit control answer update (CCA-U) message to include the default-EPS-Preferred-RAT-Type to provide an indication of such. PCRF 26 may provide this value in a CCA-U message based on the value returned from HSS 18 in a Sh interface SAA message. In certain embodiments, the solution can also include extending a credit control request update (CCR-U) message to include the default-EPS-Preferred-RAT-Type AVP such that PGW 22/PCEF 24 can inform the change of a default-EPS-Preferred-RAT-Type event to PCRF 26. TABLE 6, shown below, illustrates an example CC-Answer and an example CC-Request extended according to certain embodiments to include support for the default-EPS-Preferred-RAT-type AVP.

TABLE 6

```
<CC-Answer> ::= < Diameter Header: 272, PXY >
    < Session-Id >
    { Auth-Application-Id }
    { Origin-Host }
    { Origin-Realm }
    [ Result-Code ]
    ..................
    [default-EPS-Preferred-RAT-Type] //New parameter
<CC-Request> ::= < Diameter Header: 272, PXY >
    < Session-Id >
    { Auth-Application-Id }
    { Origin-Host }
    { Origin-Realm }
    [ Result-Code ]
    ....................
    [default-EPS-Preferred-RAT-Type] //New parameter
```

In one or more embodiments, operation via bearer binding function (BBF) 84 for multi-access may be provided as follows:

A) A bearer is identified by (QCI+eARP+RAT type) [Note the combination of identifiers including QCI, eARP and RAT type may be referred to using the shorthand notation 'QCI+eARP+RAT type' for various embodiments described herein.]

B) PCRF 26 may supply the PCC rules to be installed, modified or removed over Gx interface to PGW 22/PCEF 24. The PCRF may provide the appropriate ARP (e.g., eARP), QCI and RAT Type for both PCC Rules and default bearer QoS so that PGW 22/PCEF 24 can perform a valid bearer binding.

C) PGW 22/PCEF, using Bearer binding function 84, may determine the QoS class identifier (QCI), ARP and RAT Type indicated by the rule received from the PCRF and may bind the rule with an IP-CAN bearer that has the same QoS class identifier (QCI), ARP and RAT type. In certain embodiments, to perform the binding, PGW 22/PCEF 24, via bearer binding function 84, may evaluate if it is possible to use an existing bearer, and if necessary invoke modification of the bearer. If no matching bearers are found then PGW 22/PCEF 24, via bearer binding function 84, can initiate establishment of a new bearer.

D) PGW 22/PCEF 24, via bearer binding function 84, can use default-EPS-RAT-Type to prefer the default bearer for a corresponding RAT type for the downlink packets.

Referring to FIG. 9, FIG. 9 is a simplified flow diagram 900 illustrating example call flows and activities associated with providing bearer binding to enable robust LTE-WiFi IP flow mobility in accordance with one potential embodiment of the present disclosure. Consider an operational example in which an IFOM capable UE, such as UE 12 is LTE attached and has a dedicated bearer for video. The UE decides to open connection on WiFi. The PGW/PCEF now has a LTE default bearer carrying the SIP signaling, an LTE-dedicated bearer carrying video and a WiFi default bearer. In the present example, the PCRF installs PCC rules on the WiFi default bearer for video and indicates the WiFi as the preferred RAT Type. As a result, the PGW/PCEF moves the video onto the WiFi default bearer. If the WiFi PDN connection is lost then the PGW/PCEF moves the video downlink to back to the LTE connection. FIG. 9 includes various example flows and activities, which further illustrate various features of the above described example.

In 902, a given IFOM capable UE, such as UE 12 is attached to a single APN identified by apn1.name.com via EUTRAN (e.g., LTE) and WLAN (e.g., WiFi). In 904, PGW 22/PCEF 24 and PCRF 26 have active session(s) for EUTRAN and WLAN. PCRF 26 provides RAT type, QCI and eARP for one or more PCC rule(s) to PGW 22/PCEF 24 via one or more CCA messages. PCRF 26 can also provide default-EPS-Preferred-RAT-Type to PGW 22/PCEF 24. In 906, UE 12 is allocated IP address IP1 (e.g., via a create session response message from PGW 22/PCEF 24) and has two default bearers associated thereto, as shown in 910, 912. In 908, PGW 22/PCEF 24 provides support for two default bearers (EUTRAN and WLAN) with a default bearer preferred RAT type equal to WLAN for handling downlink (DL) packets toward UE 12.

As shown at 910, a first default bearer having EBI=5 for RAT type=EUTRAN is established for UE 12. PGW 22/PCEF 24 may receive uplink (UL) packets from UE 12 via UTRAN, yet there is no traffic flow template (TFT) provided for downlink (DL) packets as the default bearer preferred RAT type is set to WLAN in the particular embodiment. As shown at 912, a second default bearer having EBI=7 for RAT type=WAN is established for UE 12. The default WLAN bearer is identified by QCI, eARP and RAT type. Note the combination of identifiers including QCI, eARP and RAT type may be referred to using the shorthand notation 'QCI+eARP+RAT type' to for various embodiments described herein. PGW 22/PCEF 24 may receive uplink (UL) packets via WLAN and may forward or route downlink (DL) packets via WLAN as provided by the default bearer preferred RAT type being identified as WLAN.

Referring to FIGS. 10A-10C, FIGS. 10A-10C are simplified flow diagrams 1000A-1000C illustrating potential call flows and activities associated with providing bearer binding to enable robust LTE-WiFi IP flow mobility in accordance with one potential embodiment of the present disclosure. In 1002, a given UE such as UE 12 is connected via LTE (e.g., over EUTRAN access) to a particular APN identified as apn1.name.com. In 1004, PGW 22/PCEF 24 and PCRF 26 have active session(s) for EUTRAN RAT type. In a particular embodiment, during initial attach to LTE, PCRF 26 sends a credit control answer update (CCA-U) with: A) default-EPS-Bearer-QoS AVP including identifiers (QCI, eARP, EUTRAN) and one or more bit rate(s); and B) instructions to create a dedicated Video bearer according to a first PCC rule, PCC-Rule-1, which includes QoS-Information AVP in the Charging-Rule-Install AVP including identifiers (QCI-3, eARP-3 and RAT type=LTE) as well as one or more bit rate(s).

As shown at 1006, UE 12 is allocated IP address IP1 and has two bearers associated thereto as shown in 1008 and 1010. A default LTE bearer having EBI=5 for RAT type=EUTRAN is shown in 1008. The default LTE bearer is identified by PGW 22/PCEF 24 according to QCI, eARP and RAT type=EUTRAN as provided via the CCA-U in 1004. In a particular embodiment, Session Initiation Protocol (SIP) signaling may be provided on the default LTE bearer. A dedicated LTE bearer having EBI=7 for RAT type=EUTRAN is shown in 1012. The dedicated LTE bearer is identified by PGW 22/PCEF 24 according to QCI-3, eARP-3, RAT type=EUTRAN, as provided via the CCA-U shown in 1004. In a particular embodiment, Video Real-time Transport Protocol (RTP) communications may be provided on the dedicated LTE bearer.

At 1012, IFOM capable UE 12 switches on WiFi to attach to apn1.name.com for IFOM creation. At 1014, UE 12 attaches to WLC 30 and at 1016 WLC 30 opens at least one connection at SaMOG AGW 32 for UE 12. At 1018, SaMOG AGW 32 creates a PDN connection with PGW 22/PCEF 24 (e.g., using a create session (CS) request) and includes an IFOM indication during the creation to signal to PGW 22/PCEF 24 that the PDN connection is for an IFOM scenario as opposed to a handover scenario. In certain embodiments, the IFOM indication can be provided by toggling a handover indication (HI) to identify whether a CS request pertains to a handover related scenario or an IFOM related scenario.

At 1020, PGW 22/PCEF 24 sends a credit control request update (CCR-U) message to PCRF 26 including the default-EPS-Bearer-QoS AVP for the WLAN, which includes RAT type set to WLAN and also includes the IFOM indication. In various embodiments, the CCR-U can include a list of all RAT types available to a given UE (e.g., WLAN, EUTRAN, etc.) At 1022, PCRF 26 determines one or more PCC Rule(s) for UE 12 for the corresponding RAT type as well as the default preferred RAT type for handling DL data. At 1024, PCRF 26 communicates a CCA-U to PGW 22/PCEF 24 including PCC Rule(s) for the corresponding authorized default-EPS-Bearer-QoS, the default-EPS-Preferred-RAT-Type AVP and/or any other QoS info, such as, for example, bit rate(s), Rating Groups, etc. For the present example it is assumed that PCRF 26 provides PCC-Rule-1 to delete the Video bearer on LTE and provides a second PCC Rule, PCC-Rule-2, which provides for the video bearer to be bound to the WiFi default bearer.

At 1026, PGW 22/PCEF 24, via bearer binding function 84, deletes the dedicated Video bearer on LTE and binds the Video bearer on the WiFi default bearer having an EBI=7 based on the example instructions provided by PCRF 26. The resulting default bearers are shown at 1028 and 1032. At 1028, the default LTE bearer is shown for SIP signaling. The deleted dedicated LTE bearer is shown at 1030. At 1032, the default WiFi bearer is shown in which PGW 22/PCEF 24 binds the PCC rule for Video on the WiFi default bearer. Accordingly, in certain embodiments, PGW 22/PCEF 24 can support handling of data for two default bearers attached to the same single APN and PDN connection via identification of PCC Rules and bearers according to QCI, eARP (or ARP, depending on configuration) and RAT type.

Figure 11A:
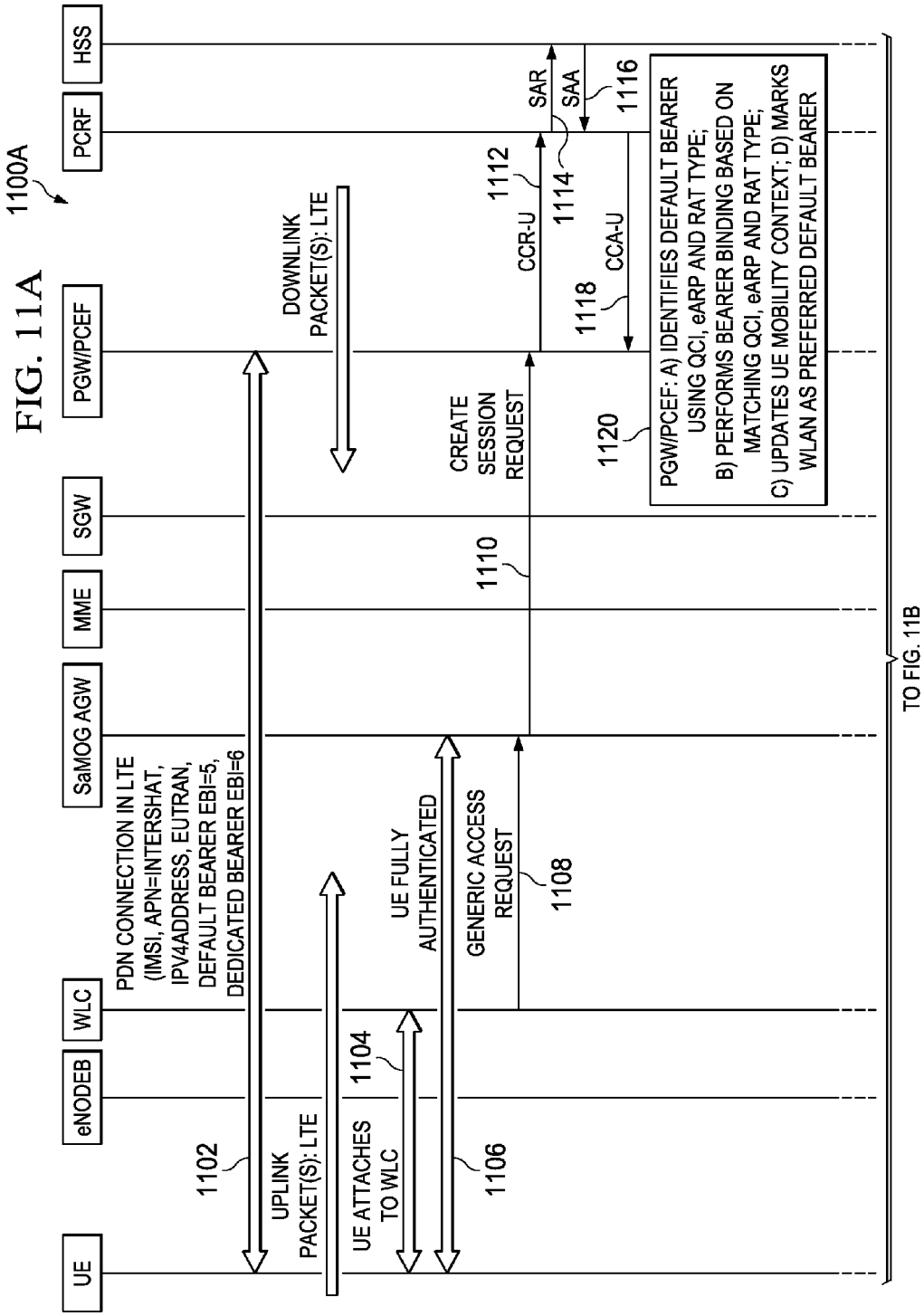
Figure 12A:
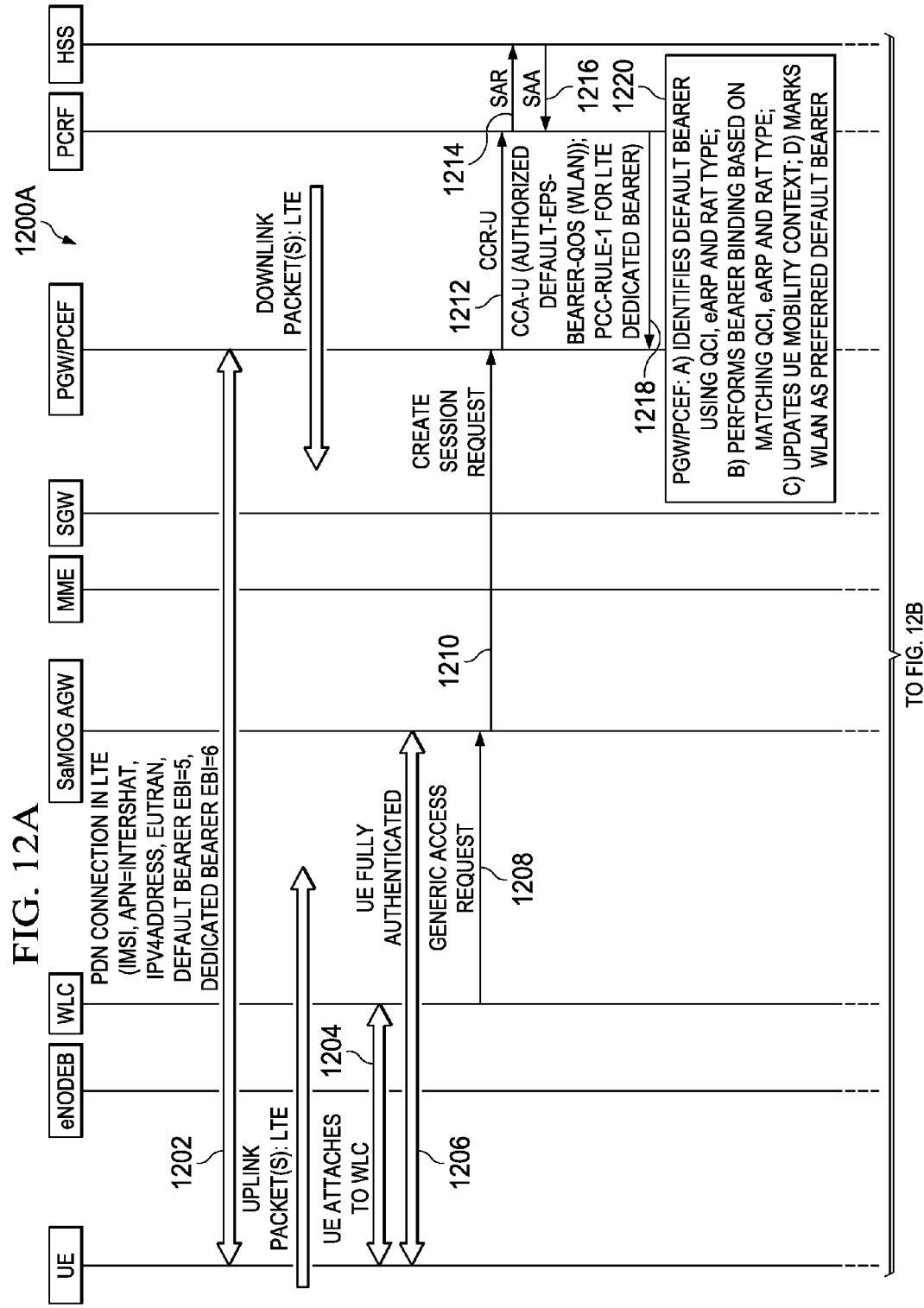
FIGS. 12A-12D are simplified flow diagrams illustrating yet other potential flows and activities associated with providing bearer binding to enable IP flow mobility in accordance with one potential embodiment of the present disclosure.
Figure 12B:
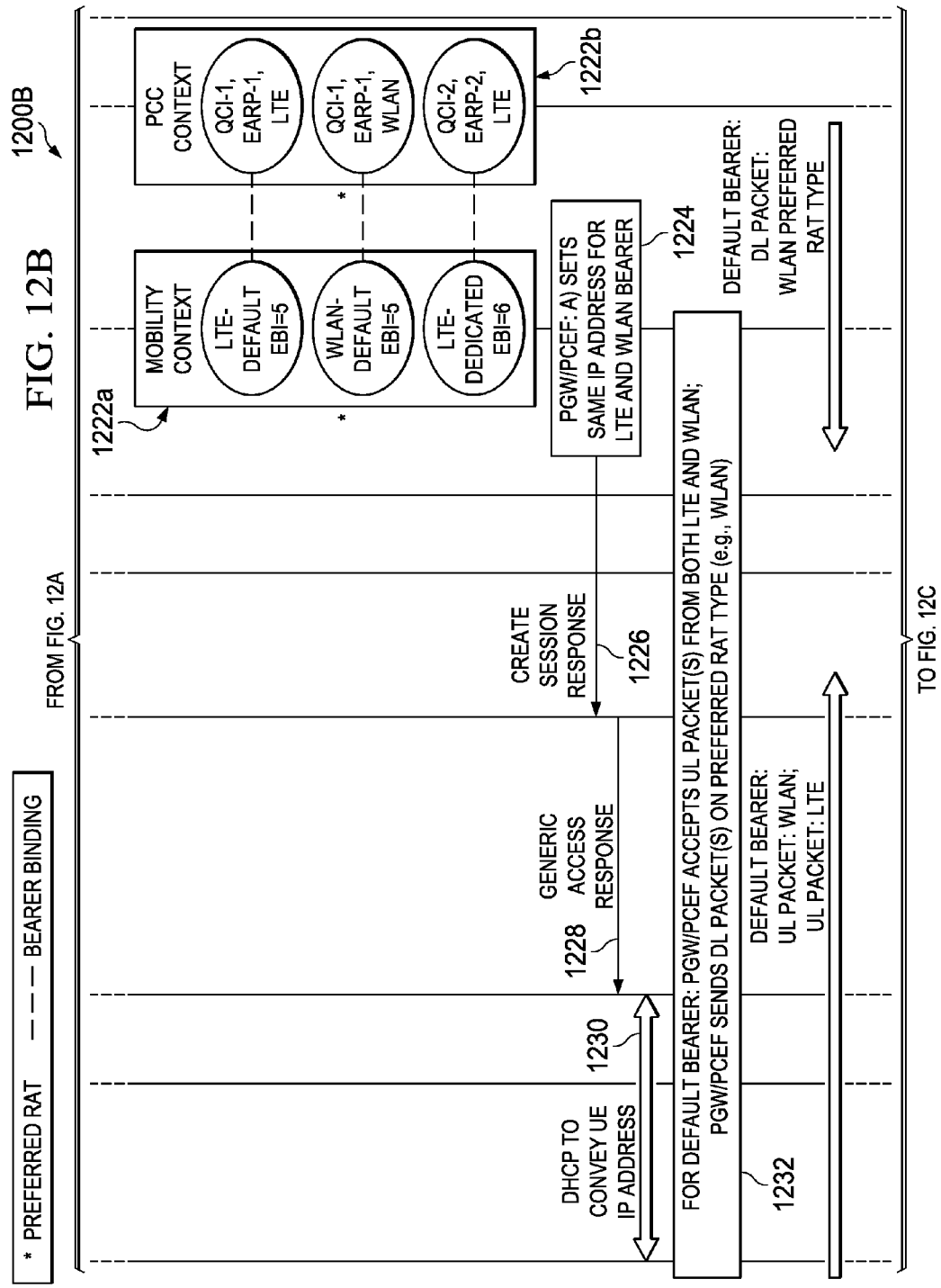
Figure 12C:
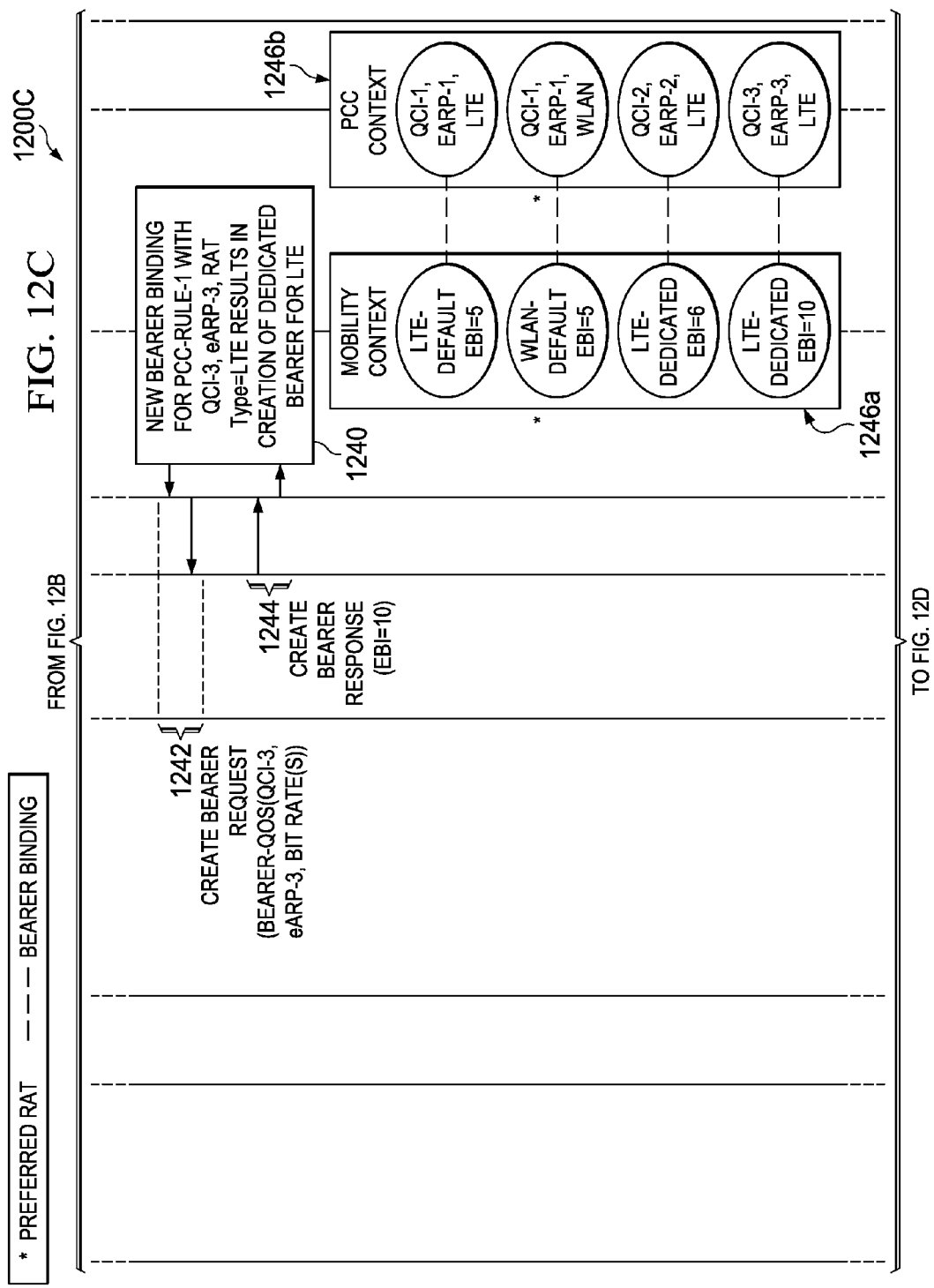
Figure 12D:
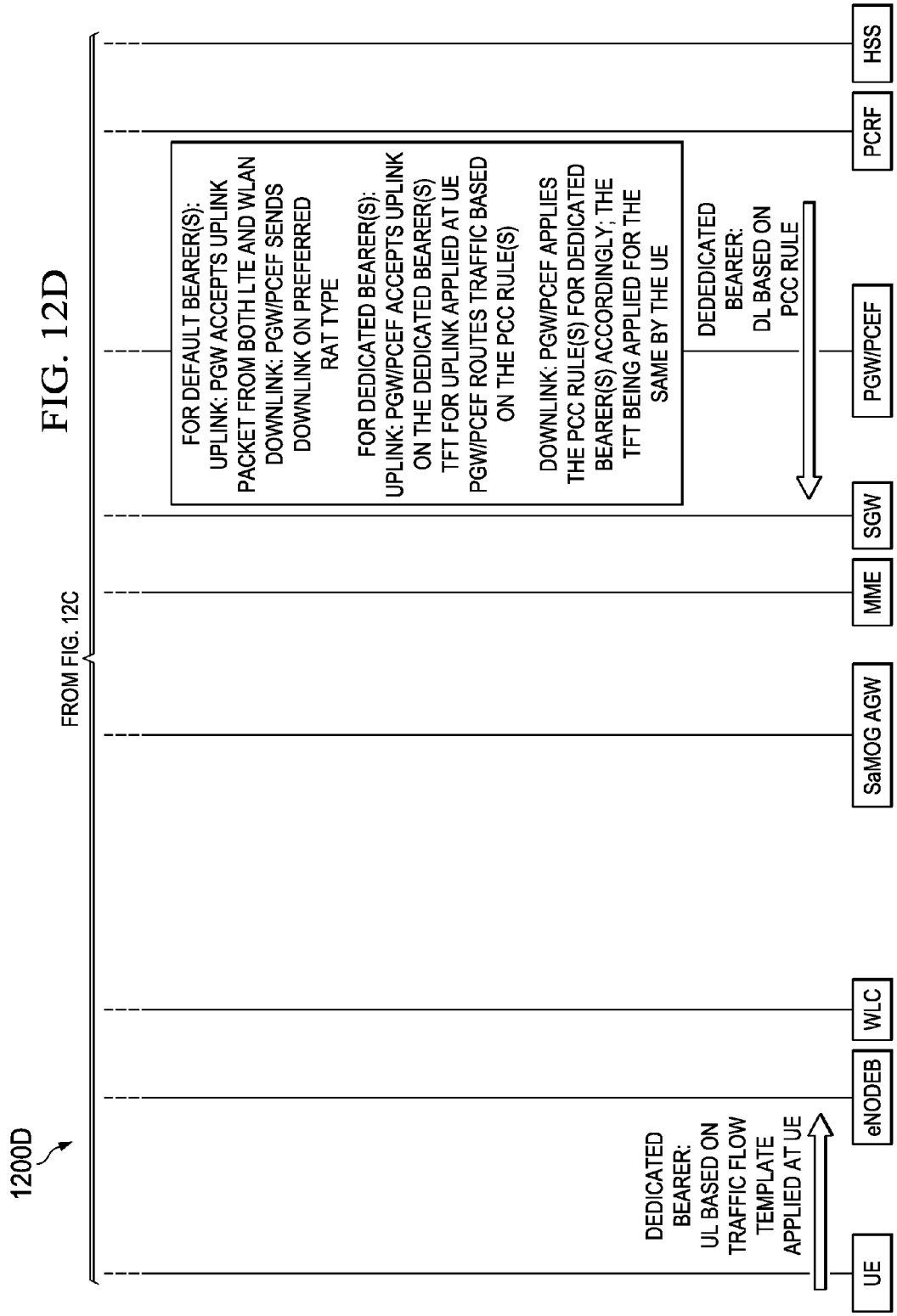

Referring to FIGS. 11A-11C, FIGS. 11A-11C are simplified flow diagrams 1100A-1100C illustrating potential call flows and activities associated with providing bearer binding to enable robust LTE-WiFi IP flow mobility in accordance with one potential embodiment of the present disclosure. In general, FIGS. 11A-11C illustrate features related to interactions with HSS 18, updating mobility context for UE 12, downlink (DL) packet handling in various use cases and changes in preferred default bearer RAT type.

As shown at 1102, a packet data network (PDN) connection in LTE is established for IFOM capable UE 12. In a particular embodiment, the PDN connection includes the International Mobile Subscriber Identification (IMSI) for the user associated with UE 12, APN (e.g., named 'intershat' for this example) to which UE 12 has one or more session(s) established, an allocated IP address (e.g., an Internet protocol (IP) version 4 (IPv4) address) a RAT type association indicating EUTRAN, a default bearer having EBI=5 and a dedicated bearer having EBI=6. In various embodiments, the allocated IP address can also be an IP version 6 (IPv6) address. For the PDN connection, uplink and downlink packet(s) for UE 12 at this point in the flow diagram are communicated via LTE. At 1104, UE 12 switches on WiFi and attaches to WLC 30. At 1106, UE 12 is fully authenticated via SaMOG AGW 32. At 1108, WLC 30 communicates a generic access request to SaMOG AGW 32 to establish a session for UE 12 via APN=intershat. In a particular embodiment, the generic access request can include the Proxy Request flag set to TRUE, the mobile node identifier (MN-ID) for UE 12 (e.g., IMSI), the handover indication (HI) set to FALSE (e.g., indicating an IFOM creation) and RAT type set to WLAN.

At 1110, SaMOG AGW 32 communicates a create session (CS) request to PGW 22/PCEF 24. In a particular embodiment, the CS request can include the IMSI, APN indicating 'intershat', RAT type set to WLAN, PDN address allocation (PAA) set to version 4 PDN (v4PDN), the corresponding HI set to false, EBI=5 for the default bearer and/or interface type set to S2a. At 1112, PGW 22/PCEF 24 communicates a credit control request update (CCR-U) to PCRF 26. In a particular embodiment, the CCR-U includes, among other information, the IMSI network address identifier (IMSI-NAI), APN, IP address, default-EPS-bearer-QoS AVP for QCI-1, eARP-1 and WLAN for the default bearer. At 1114, PCRF 26 communicates a DIAMETER-based Server Assignment Request (SAR) to HSS 18. At 1116, HSS 18 provides the default bearer preferred RAT type to PCRF 26 via a DIAMETER-based sever assignment answer (SAA) including the default-EPS-Preferred-RAT-Type AVP indicating WLAN as the preferred RAT type. In certain embodiments, HSS 18 can provide to PCRF 26 other subscriber related policy and/or charging related information, which can be provided via a subscription profile repository (SPR) or other subscriber database.

At 1118, PCRF 26 communicates a credit control answer update (CCA-U) to PGW 22/PCEF 24. In a particular embodiment, the CCA-U includes the authorized default-EPS-Bearer-QoS AVP for QCI-1, eARP-1 and WLAN; one or more associated bit rate(s), PCC Rule(s), rating group, etc.; and the default-EPS-Preferred-RAT-Type set to WLAN. PCRF 26 identifies the WLAN bearer using QCI, eARP and RAT type for the bearer (e.g., QCI-1, eARP-1, WLAN). At 1120, PGW 22/PCEF 24, via bearer binding function 84, identifies the bearer according to QCI, eARP and RAT type; performs bearer binding based on matching the received QCI-1, eARP-1 and WLAN for the default WLAN bearer; updates the mobility context for UE to reflect the bearer binding(s); and marks WLAN as the preferred default bearer in the mobility context based on the default-EPS-Preferred-RAT-Type AVP received from PCRF 26. The resulting bearers, bearer bindings (represented by dashed lines) and corresponding QCI, eARP and RAT type identifiers for each bearer policy charging and control (PCC) context is shown in 1122*a* and 1122*b*. The PCC context, as referred to herein, provides a contextual mapping of PCC Rules to corresponding bearers. In essence, the PCC context is the context of the UE's context at PGW 22/PCEF 24, which can contain PCRF side information such as bearer binding, etc.

At 1124, PGW 22/PCEF 24 sets the same IP address for the LTE and WLAN bearers and, at 1126, communicates a create session (CS) response to SaMOG AGW 32. In a particular embodiment, the CS response includes the PDN address allocation (PAA) set to the IPv4 address allocated on LTE and the WLAN default bearer context including the authorized QCI-1, eARP-1 and bit rate(s) for the WLAN default bearer. At 1128, SaMOG AGW 32 communicates a generic access response to wireless LAN controller (WLC) 30. In a particular embodiment, the access response may include the IPv4 Home Address allocated on LTE, proxy request flag set to TRUE, MN-ID for UE 12, the Home Address Request option set, the handover indication (HI) set to FALSE and WLAN identifier. AT 1130, WLC 30 may use dynamic host configuration protocol (DHCP) to convey to UE 12 the IP address.

Following the attach via WLAN access, as shown at 1132, PGW 22/PCEF 24 accepts uplink (UL) packet(s) from both LTE and WLAN and sends downlink (DL) packet(s) on the preferred RAT type WLAN. In certain embodiments, PGW 22/PCEF 24 sends DL packets using the preferred RAT type, when the packets are not matched to another bearer for UE 12 as shown at 1134 in FIG. 11C. For example, if a DL packet is communicated to PGW 22/PCEF 24 and is not matched to the dedicated LTE bearer EBI=6, then the packets are routed on WLAN using the WLAN default bearer. PGW 22/PCEF 24 can also be configured to route DL packet(s) over LTE in various cases, including but not limited to, when the WiFi PDN becomes disconnected for UE 12 or when pause charging is received (e.g., using a modify bearer (MB) request) due to loss of radio (e.g., WiFi) connection with UE 12. For such configurations and/or conditions, PGW 22/PCEF 24 can send DL packet(s) on LTE if WiFi is unavailable or inaccessible. Also shown in FIG. 11C at 1138, PGW 22/PCEF 24 can indicate a change of default bearer preferred RAT type to PCRF 26 via CCR-U and CCA-U messages.

In various embodiments, PCRF 26 can indicate to PGW 22/PCEF 24 to change the default preferred RAT type based on the type of content and/or data. In some embodiments, PCRF 26 can set the default preferred RAT type based on APN. Say for example, that the default preferred RAT type is set to LTE for an IMS APN and for, say internet browsing, it is set to WLAN. In another example, PCRF 26 could also configure the default preferred RAT type to be changed to WLAN from LTE whenever WLAN becomes available to conserve LTE radio resources. The above examples are just a few of the many configurations that can be provided to change the default preferred RAT type. Virtually any other configurations can be used using similar means and methods as described herein, and, thus, are clearly within the scope of the present disclosure.

Referring to FIGS. 12A-12D, FIGS. 12A-12D are simplified flow diagrams 1200A-1200D illustrating potential call flows and activities associated with providing bearer binding to enable robust LTE-WiFi IP flow mobility in accordance with one potential embodiment of the present disclosure. In general, FIGS. 12A-12D illustrate features related to interactions handling creation of dedicated bearers and updating of the mobility context for UE 12. The flows and activities 1202-1232 for FIGS. 12A-12D are largely the same as the flows and activities 1102-1132 for FIGS. 11A-11C except that in flow 1218 for FIG. 12A, the CCA-U communicated from PCRF 26 to PGW 22/PCEF 24 includes a PCC rule, PCC-Rule-1, for LTE which includes the QoS-Information AVP in the Charging-Rule-Install AVP set to QCI-3, eARP-3, RAT type=LTE to create another LTE dedicated bearer.

Continuing to 1240, PGW 22/PCEF 24 creates a new bearer binding for PCC-Rule-1 with QCI-3, eARP-3 and RAT type=LTE via a create bearer request communicated to MME 16 at 1242 and a create bearer response received from MME 16 at 1244, which results in creation of a dedicated bearer having EBI=10 for LTE. PGW 22/PCEF 24 updates the mobility context for UE 12 to include LTE dedicated bearer EBI=10, which is shown at 1246*a*. The PCC context for UE 12 is updated via PCRF 26 as shown at 1246*b* to include the mapping of QCI-3, eARP-3 for PCC-Rule-1 to the corresponding LTE dedicated bearer.

Various functions for PGW 22/PCEF 24 are illustrated at 1250. For default bearer(s), PGW 22/PCEF 24 accepts or routes uplink packet(s) from LTE and WLAN default bearers and PGW 22/PCEF 24 sends downlink packet(s) on the preferred RAT type, e.g., WLAN for these example flows. For dedicated bearer(s), PGW 22/PCEF 24 accepts or routes traffic from the dedicated bearer(s) (e.g., a traffic flow template for uplink packets are applied at the UE) based on the provided PCC Rule(s) and PGW 22/PCEF 24 applied the PCC Rule(s) for the dedicated bearer(s) for routing downlink packets. It should be noted that there is no preferred-RAT-Type AVP required for dedicated bearer(s), as the PCC Rule for a dedicated bearer is sufficient to route the traffic for the dedicated bearer. Thus, as shown in FIGS. 12A-12D, PGW 22/PCEF 24 can be configured to route traffic for multiple default bearers and multiple dedicated bearers according to various embodiments.

Turning to FIG. 13, FIG. 13 is a simplified flow diagram 1300 illustrating example operations associated with providing bearer binding to enable IP flow mobility in accordance with one potential embodiment of the present disclosure. In 1302, PGW 22/PCEF 24 receives a policy related rule for a given UE, such as IFOM capable UE 12, while the UE is currently accessing a given APN using a first RAT type associated with a first default bearer for the UE, where the policy related rule is associated with the UE accessing the APN using a second RAT type. In a particular embodiment, the policy related rule is a given PCC rule for the UE. In a particular embodiment, the PCC rule is identified according to parameters such as a QoS Class Identifier (QCI), an allocation and retention policy (ARP) or evolved ARP (eARP) and a RAT type. In 1304, PGW 22/PCEF 24, via bearer binding function 84, binds the policy related rule to a second default bearer for the UE to access the APN, where the second default bearer is associated with the second RAT type. In 1306, PGW 22/PCEF 24 updates the mobility context for UE 12 to include the second default bearer.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network flows, and signaling protocols, communication system 10 may be applicable to other exchanges, routing protocols, or routed protocols to provide IP flow mobility in a network. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving an indication of a radio access technology (RAT) change for a user equipment (UE);
   determining availability of a preferred RAT type for a policy related rule associated with the UE, wherein the policy related rule includes, at least in part, the preferred RAT type for one or more service data flows for the UE; and
   configuring the one or more service data flows for the UE based, at least in part, on a change in availability of the preferred RAT type following the RAT change wherein based on a determination that the preferred RAT has become unavailable the configuring comprises:
      determining whether the one or more service data flows can be moved to a non-preferred RAT type, which is currently available to the UE, based, at least in part, on a session continuity indicator for the one or more service data flows; and
      moving the one or more service data flows to the non-preferred RAT type based on the session continuity indicator providing for inter-RAT session continuity.

2. The method of claim 1, further comprising:
routing downlink packets to the UE using the one or more service data flows for the preferred RAT type based on the preferred RAT type being available.

3. The method of claim 1, wherein determining includes one of:
determining that the preferred RAT type for the one or more service data flows has become available following the RAT change;
determining that the preferred RAT type for the one or more service data flows has become unavailable following the RAT change; and
determining that the preferred RAT type for the one or more service data flows has remained available following the RAT change.

4. The method of claim 1, wherein, based on the preferred RAT type becoming available, the configuring includes moving the one or more service data flows to the preferred RAT type.

5. The method of claim 4, wherein the configuring includes removing the policy related rule for a current RAT type to which the UE is connected and installing another policy related rule for the preferred RAT type which has become available.

6. The method of claim 1, further comprising:
determining whether an uplink packet for the policy related rule is received from the UE using the preferred RAT type; and
applying an exception rating group for charging a session associated with the UE based on the uplink packet not being received from the UE using the preferred RAT type.

7. The method of claim 1, wherein the preferred RAT type is WiFi for the one or more service data flows.

8. One or more non-transitory tangible media encoding logic that includes instructions for execution by a processor, wherein the execution causes the processor to perform operations comprising:
receiving an indication of a radio access technology (RAT) change for a user equipment (UE);
determining availability of a preferred RAT type for a policy related rule associated with the UE, wherein the policy related rule includes, at least in part, the preferred RAT type for one or more service data flows for the UE; and
configuring the one or more service data flows for the UE based, at least in part, on a change in availability of the preferred RAT type following the RAT change wherein based on a determination that the preferred RAT has become unavailable the configuring comprises:
determining whether the one or more service data flows can be moved to a non-preferred RAT type, which is currently available to the UE, based, at least in part, on a session continuity indicator for the one or more service data flows; and
moving the one or more service data flows to the non-preferred RAT type based on the session continuity indicator providing for inter-RAT session continuity.

9. The media of claim 8, wherein the execution causes the processor to perform further operations comprising:
routing downlink packets to the UE using the one or more service data flows for the preferred RAT type based on the preferred Rat type being available.

10. The media of claim 8, wherein determining includes one of:
determining that the preferred RAT type for the one or more service data flows has become available following the RAT change;
determining that the preferred RAT type for the one or more service data flows has become unavailable following the RAT change; and
determining that the preferred RAT type for the one or more service data flows has remained available following the RAT change.

11. The media of claim 8, wherein, based on the preferred RAT type becoming available, the configuring includes moving the one or more service data flows to the preferred RAT type.

12. The media of claim 11, wherein the configuring includes removing the policy related rule for a current RAT type to which the UE is connected and installing another policy related rule for the preferred RAT type which has become available.

13. The media of claim 8, wherein the execution causes the processor to perform further operations comprising:
determining whether an uplink packet for the policy related rule is received from the UE using the preferred RAT type; and
applying an exception rating group for charging a session associated with the UE based on the uplink packet not being received from the UE using the preferred RAT type.

14. An apparatus, comprising:
a memory element for storing data; and
a processor for executing instructions associated with the data, wherein the executing causes the apparatus to perform operations comprising:
receiving an indication of a radio access technology (RAT) change for a user equipment (UE);
determining availability of a preferred RAT type for a policy related rule associated with the UE, wherein the policy related rule includes, at least in part, the preferred RAT type for one or more service data flows for the UE; and
configuring the one or more service data flows for the UE based, at least in part, on a change in availability of the preferred RAT type following the RAT change wherein based on a determination that the preferred RAT has become unavailable the configuring comprises:
determining whether the one or more service data flows can be moved to a non-preferred RAT type, which is currently available to the UE, based, at least in part, on a session continuity indicator for the one or more service data flows; and
moving the one or more service data flows to the non-preferred RAT type based on the session continuity indicator providing for inter-RAT session continuity.

15. The apparatus of claim 14, wherein the executing causes the apparatus to perform further operations comprising:
routing downlink packets to the UE using the one or more service data flows for the preferred RAT type based on the preferred Rat type being available.

16. The apparatus of claim 14, wherein determining includes one of:
determining that the preferred RAT type for the one or more service data flows has become available following the RAT change;

determining that the preferred RAT type for the one or more service data flows has become unavailable following the RAT change; and determining that the preferred RAT type for the one or more service data flows has remained available following the RAT change.

17. The apparatus of claim 14, wherein, based on the preferred RAT type becoming available, the configuring includes moving the one or more service data flows to the preferred RAT type.

18. The apparatus of claim 17, wherein the configuring includes removing the policy related rule for a current RAT type to which the UE is connected and installing another policy related rule for the preferred RAT type which has become available.

* * * * *